US011882202B2

(12) United States Patent
Vijayadharan et al.

(10) Patent No.: US 11,882,202 B2
(45) Date of Patent: Jan. 23, 2024

(54) INTENT BASED NETWORK DATA PATH TRACING AND INSTANT DIAGNOSTICS

(71) Applicant: Cisco Technology, Inc., San Jose, CA (US)

(72) Inventors: Sajay Vijayadharan, San Jose, CA (US); Arun P. Venugopal, Fremont, CA (US); Manas Pati, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 37 days.

(21) Appl. No.: 16/393,732

(22) Filed: Apr. 24, 2019

(65) Prior Publication Data

US 2020/0162589 A1 May 21, 2020

Related U.S. Application Data

(60) Provisional application No. 62/768,601, filed on Nov. 16, 2018.

(51) Int. Cl.
*H04L 69/22* (2022.01)
*H04L 47/24* (2022.01)
*H04L 45/745* (2022.01)

(52) U.S. Cl.
CPC ............ *H04L 69/22* (2013.01); *H04L 45/745* (2013.01); *H04L 47/24* (2013.01)

(58) Field of Classification Search
CPC ....... H04L 69/22; H04L 45/745; H04L 47/24; H04L 43/00; H04L 41/0809; H04L 41/0246; H04L 41/12; H04L 43/0817; H04L 41/22; H04L 43/10; H04L 41/16; H04L 41/0893
See application file for complete search history.

(56) References Cited

U.S. PATENT DOCUMENTS 7,715,438 B1 5/2010 Frink et al.
8,743,872 B2 6/2014 Chidambaram et al.
(Continued)

OTHER PUBLICATIONS

"Software-Defined Access Deployment Guide," Cisco.com, Oct. 2018, pp. 1-91.

*Primary Examiner* — Derrick W Ferris
*Assistant Examiner* — Mohammed M Murshid
(74) *Attorney, Agent, or Firm* — Polsinelli P.C.

(57) ABSTRACT

Systems and methods provide for tracing traffic through a network. Based on a negotiation between a first network element and a second network element, the first network element can determine a customized packet type supported by the second network element. A tracing header can be added to a packet received by the first network element to generate a modified packet. The tracing header can include a unique identifier and be customized to the determined customized packet type. Based on the unique identifier, a second network element can be identified by tracing the modified packet as it is forwarded to the second network element. Forwarding information from the second network element that is associated with the modified packet can be collected, where the unique identifier is associated with the forwarding information. The unique identifier and the forwarding information can be sent to a controller to diagnose a packet forwarding issue.

20 Claims, 16 Drawing Sheets

(56) References Cited

U.S. PATENT DOCUMENTS

| | | | |
|---|---|---|---|
| 11,438,446 B2* | 9/2022 | Liu | H04L 69/16 |
| 2007/0189178 A1* | 8/2007 | Ottamalika | H04L 12/66 |
| | | | 370/252 |
| 2009/0073881 A1* | 3/2009 | Cui | H04L 47/30 |
| | | | 370/235 |
| 2011/0194403 A1* | 8/2011 | Sajassi | H04L 12/462 |
| | | | 370/217 |
| 2015/0016286 A1* | 1/2015 | Ganichev | H04L 45/42 |
| | | | 370/252 |
| 2015/0244617 A1* | 8/2015 | Nakil | H04L 41/0897 |
| | | | 709/224 |
| 2017/0346709 A1 | 11/2017 | Menon et al. | |
| 2018/0091603 A1* | 3/2018 | Sarangapani | H04L 43/0864 |
| 2018/0091251 A1 | 5/2018 | Hanneman, Jr. | |
| 2018/0191471 A1* | 7/2018 | Elhaddad | H04L 1/24 |
| 2018/0278514 A1* | 9/2018 | Chadha | H04L 43/10 |
| 2021/0144082 A1* | 5/2021 | Bisht | H04L 41/12 |
| 2021/0320861 A1* | 10/2021 | Dutta | H04L 45/22 |

* cited by examiner

INTENT BASED NETWORK DATA PATH TRACING AND INSTANT DIAGNOSTICS

CROSS-REFERENCE TO RELATED APPLICATIONS

This application claims priority to U.S. Provisional Patent Application No. 62/768,601, filed on Nov. 16, 2018, the content of which is incorporated herein by reference in its entirety.

TECHNICAL FIELD

The subject matter of this disclosure relates in general to the field of computer networking, and more particularly, to systems and methods for improving the operation of an enterprise network.

BACKGROUND

An enterprise network can provide connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as offices, hospitals, colleges and universities, oil and gas facilities, factories, and similar locations. Some of the unique challenges an enterprise network may face include integrating wired and wireless devices, on-boarding computing devices and things that can appear anywhere in the network and maintaining connectivity when the devices and things migrate from location to location within the network, supporting bring your own device (BYOD) capabilities, connecting and powering Internet-of-Things (IoT) devices, and securing the network despite the vulnerabilities associated with Wi-Fi access, device mobility, BYOD, and IoT. Current approaches for deploying a network capable of providing these functions often require constant and extensive configuration and administration by highly skilled network engineers operating several different systems (e.g., directory-based identity services; authentication, authorization, and accounting (AAA) services, wireless local area network (WLAN) controllers; command line interfaces for each switch, router, or other network device of the network; etc.) and manually stitching these systems together. This can make network deployment difficult and time-consuming, and impede the ability of many organizations to innovate rapidly and to adopt new technologies, such as video, collaboration, and connected workspaces.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

Figure 1:
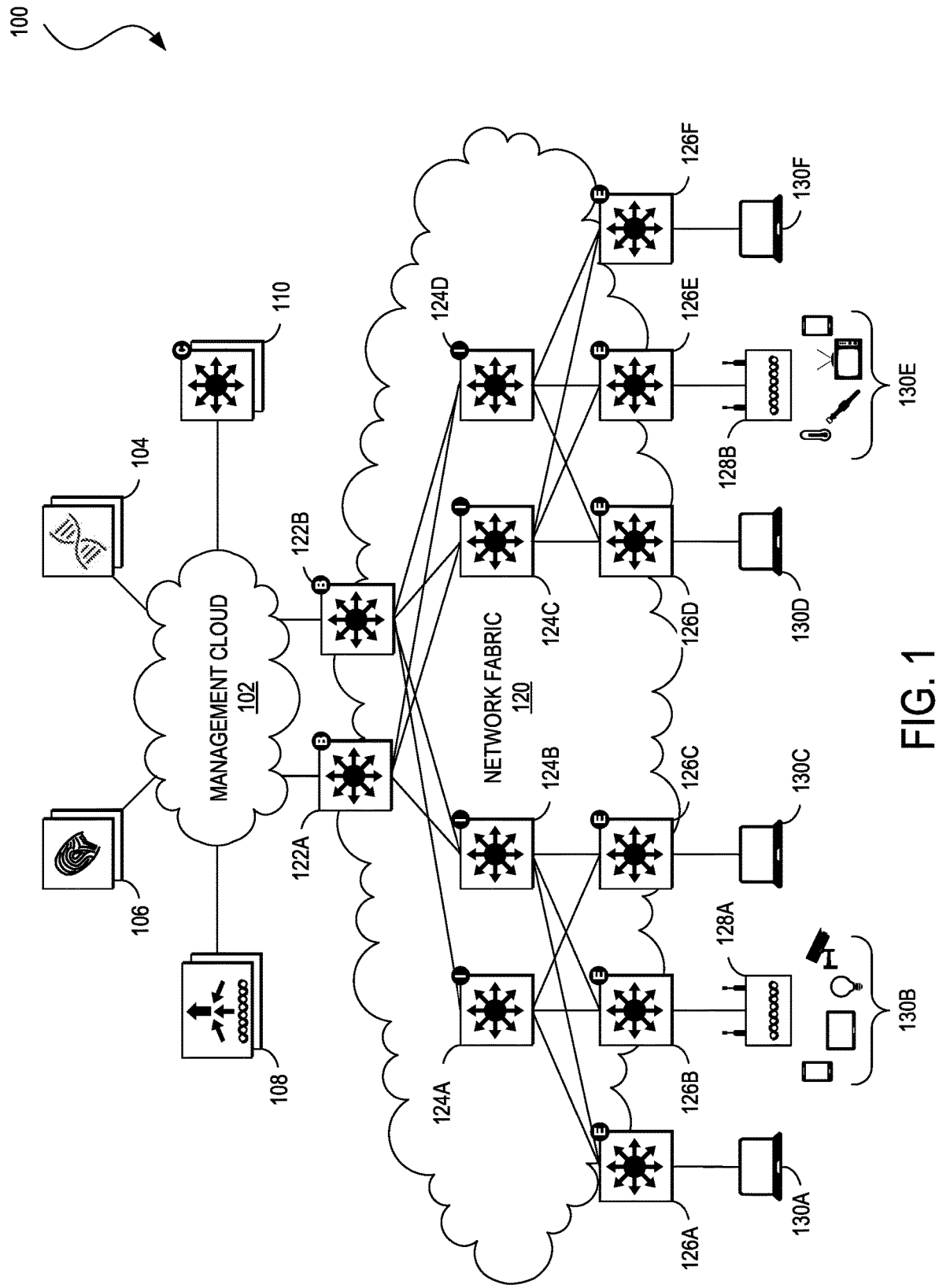
FIG. 1 illustrates an example of a physical topology of an enterprise network in accordance with some embodiments.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems and methods provide for tracing traffic through a network. Based on a negotiation between a first network element and a second network element, the first network element can determine a customized packet type supported by the second network element. A tracing header can be added to a packet received by the first network element to generate a modified packet. The tracing header can include a unique identifier and be customized to the determined customized packet type. Based on the unique identifier, a second network element can be identified by tracing the modified packet as it is forwarded to the second network element. Forwarding information from the second network element that is associated with the modified packet can be collected, where the unique identifier is associated with the forwarding information. The unique identifier and the forwarding information can be sent to a controller to diagnose a packet forwarding issue.

Example Embodiments

Systems, methods, computer-readable media, and devices are disclosed for debugging a network. If you have to debug a particular packet tracing problem, we have to log in and/or check each network element within the network for that particular packet and do that process for all the switches.

For example, in some Enterprise Networks, debugging a packet forwarding issue can be a multi-step/multi-day iterative process. Each network element is triaged based on various mechanisms including monitoring flows with SPAN/NetFlow, counters, any data path trace, verification of forwarding element programming, etc. Correlation of these data can potentially identify a packet forwarding issue on that particular node.

Packet Forwarding issues are triaged on a particular network element basis. To diagnose the particular element in the network that has issues, a network controller has to correlate various data to triage a particular packet flow across the various network elements. The controller can enable and monitor flows at each network element, but if the packets are tunneled or encapsulated in various headers, it is not possible to identify the same exact flow at the core network nodes since the controller may not have visibility into the encapsulated frames. Moreover, an active flow in the network is required to monitor, capture, and trace the packet for most cases.

There can also be multiple forwarding scenarios in the enterprise network, such as: Traditional Forwarding, VxLAN based Fabric (like Software Defined Architecture), OpenFlow Based Model, MPLS based Segmentation, etc. and we need a common infrastructure to solve the multitude of data-path networks.

DNAC based SDA architecture provides a way to manage each network element and provide policy for each end devices and users associated with those devices. Currently, SDA forwarding intent and debugging the packet flow on the network elements is usually a manual process. This causes SDA forwarding issues to be triaged by different teams (platform, software etc.) hence trouble shooting takes longer time.

The problem we were trying to solve is this: we have an enterprise network and if you have to debug a packet receiving problem, we have to go and log into multiple devices and/or services in order to receive the forwarding information for that particular packet, and we have to repeat that process for each additional type of device (e.g., switches). This is a time consuming process, because each of these devices (e.g., switches) can present different types of data. Debugging, as a result, can take a long time, such as a few days and sometimes even months to figure out what the actual problem is.

So what we are proposing is to trace the packet end to end, and also identify debugging information from each of the devices and consolidate them into a single view. This shortens our debugging time—for example from days or hours into minutes. We instantaneously get all the debugging information, including the drop reasons and where the packet has been through. The disclosed technology addresses the need for tracing a passive flow as well, which would be effective in debugging during maintenance windows (or) for periodically diagnosing critical flows.

This solution addresses the above issues and provides a mechanism for diagnosis of forwarding issues across a network segment. It also plans to integrate the SDA forwarding to the tracing mechanism providing a better visibility of the forwarding across the fabric network.

In some embodiments, the following features can include:

(1) This solution can work with a live packet or a defined set of packet inputs as described later, which means we don't have to rely on live packets in the network for generating data.

(2) Describes a mechanism by which packet filters can be applied based on packet transformation to capture the same flow across the network.

(3) Does not require the presence of a controller for tracing the flow. But the proposed technique relies on the ingress Network element to define the tracing and diagnostics behavior and can complement the controller application.

(4) This technique also details on how the obtained metadata shall enable self-diagnosis of the network.

(5) This packet tracing technique can utilize ACL matching. Our innovation can handle live packets and also generate packet for tracing a passive network and also follow packet transformations.

(6) This technique addresses the different types of packets and the capability of devices in the tracing.

(7) Does not rely on the openflow (SDN) forwarding methods to trace the flow across the network and require a controller based application. This technique shall be applied to Open Flow, Traditional and Software Defined Fabric based model as well.

(8) Does not rely on live packet in the network for trace data collection, but can instead be flexible for the presence of live packet and simulated packets as well.

(9) Does not rely on the trace collection flow as terminal decision for a given flow but openflow forwarding could alter the packet forwarding after the flow collecting the tracing information. This technique does not depend upon the forwarding ASIC implementation.

(10) This technique is not only capable of identifying the problem node in the packet path, but it can also identify why a packet is dropped, or why packet is incorrectly forwarded and can diagnose any type of problem. It also produces enough data for self-diagnosing the network.

The proposed solution provides the accurate source of truth for packet tracing and packet-forwarding diagnostics, which is the Packet Forwarding Engine (PFE) (or Data Plane) across a network segment. Enterprise networks have multitudes of Network design including Traditional Switching/Routing IP Networks, Open Flow Base networks, Network Fabrics (like VxLAN based SDA), MPLS Segmentation. The solution addresses a methodology, which is network design agnostic and based on the capabilities of Network Elements (NE).

Most of the solutions rely on filtering live network traffic based on a flow and tracing the matching packets. But, Packets get transformed over the network elements like getting tunneled through MPLS, VxLAN or GRE Tunnels as they are forwarded through the network. The filtering based on the same exact flow will not trigger a trace in core Network Elements that cannot identify the exact packet flow, as they will match on the encapsulated packet parameters.

This solution follows the packet along with its transformations in the PFE. It also follows the packet along the network and relies on the inline TraceID being carried in the packet to uniquely identify the packet trace across network elements.

This solution proposes the capability of generating the packet at the network edge where tracing has to start and carrying a unique TraceID in the packet until the edge where tracing has to stop. Though the concept of generating a packet is not new, the generated packet is not based on a particular parameter, but shall be combination of any packet fields, entire packet in pcap/hex format or capturing an entire live packet and replaying it. It enables the triaging passive flows in the network when there is no active traffic, most likely during maintenance windows and as a health check after provisioning a client.

The solutions described can do so through intent-based networking. Intent-based networking is an approach for overcoming the deficiencies, discussed above and elsewhere in the present disclosure, of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
| --- | --- |
| I need to scale out my application database | Extend network segments; update load balancer configuration; configure quality of service (QoS) |
| I have scheduled a telemedicine session at 10am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

FIG. 1 illustrates an example of a physical topology of an enterprise network 100 for providing intent-based networking. It should be understood that, for the enterprise network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the enterprise network 100 can include any number or type of resources, which can be accessed and utilized by endpoints or network devices. The illustrations and examples provided herein are for clarity and simplicity.

In this example, the enterprise network 100 includes a management cloud 102 and a network fabric 120. Although shown as an external network or cloud to the network fabric 120 in this example, the management cloud 102 may alternatively or additionally reside on the premises of an organization or in a colocation center (in addition to being hosted by a cloud provider or similar environment). The management cloud 102 can provide a central management plane for building and operating the network fabric 120. The management cloud 102 can be responsible for forwarding configuration and policy distribution, as well as device management and analytics. The management cloud 102 can comprise one or more network controller appliances 104, one or more authentication, authorization, and accounting (AAA) appliances 106, one or more wireless local area network controllers (WLCs) 108, and one or more fabric control plane nodes 110. In other embodiments, one or more elements of the management cloud 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The enterprise network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
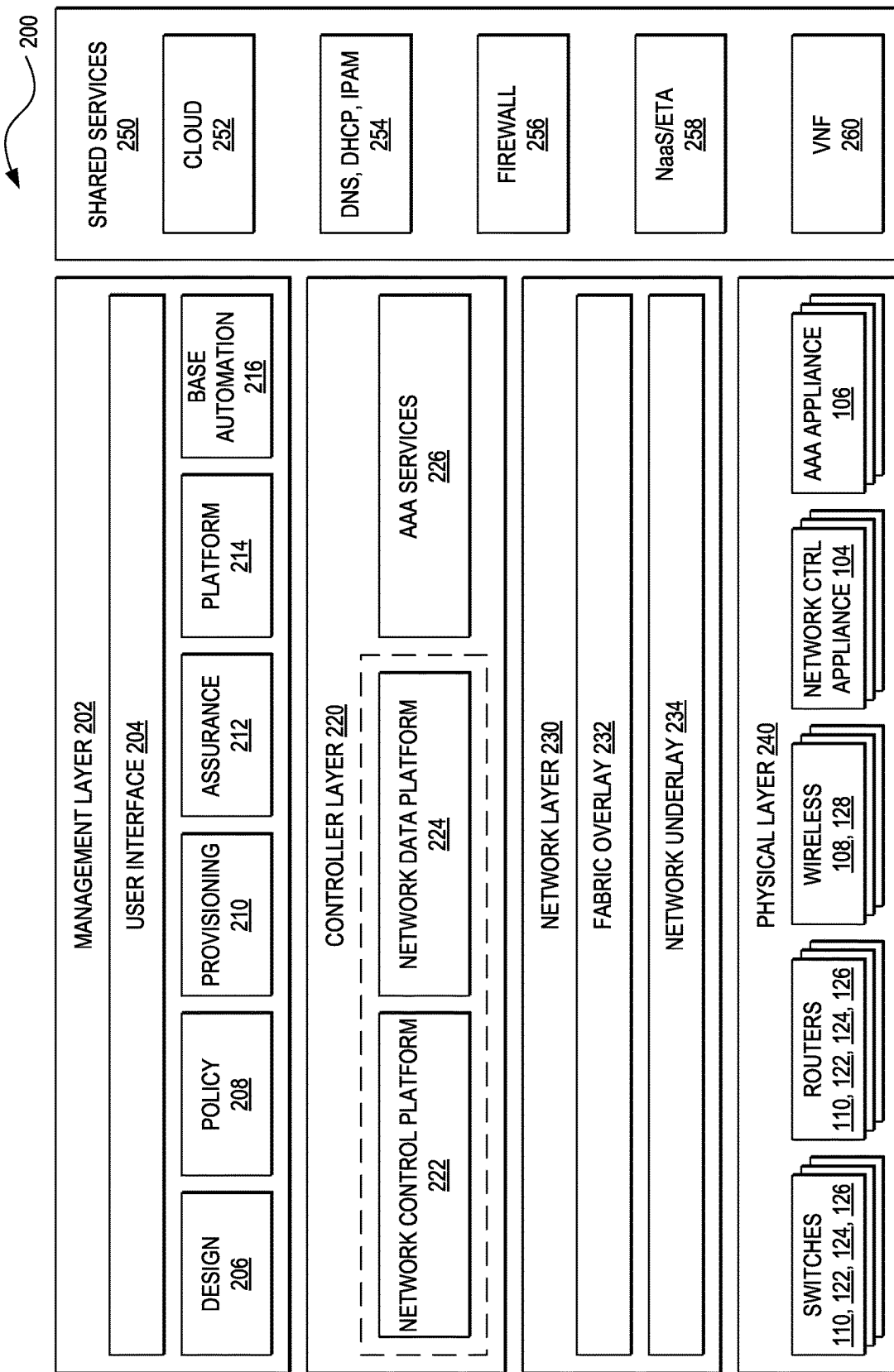
FIG. 2 illustrates an example of a logical architecture for an enterprise network in accordance with some embodiments.

FIG. 2 illustrates an example of a logical architecture 200 for an enterprise network (e.g., the enterprise network 100). One of ordinary skill in the art will understand that, for the logical architecture 200 and any system discussed in the present disclosure, there can be additional or fewer components in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage an enterprise network (e.g., the enterprise network 100). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 214 can support the top-level functions by allowing users to perform certain network-wide tasks.

FIGS. 3A-3I illustrates examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

Figure 3A:
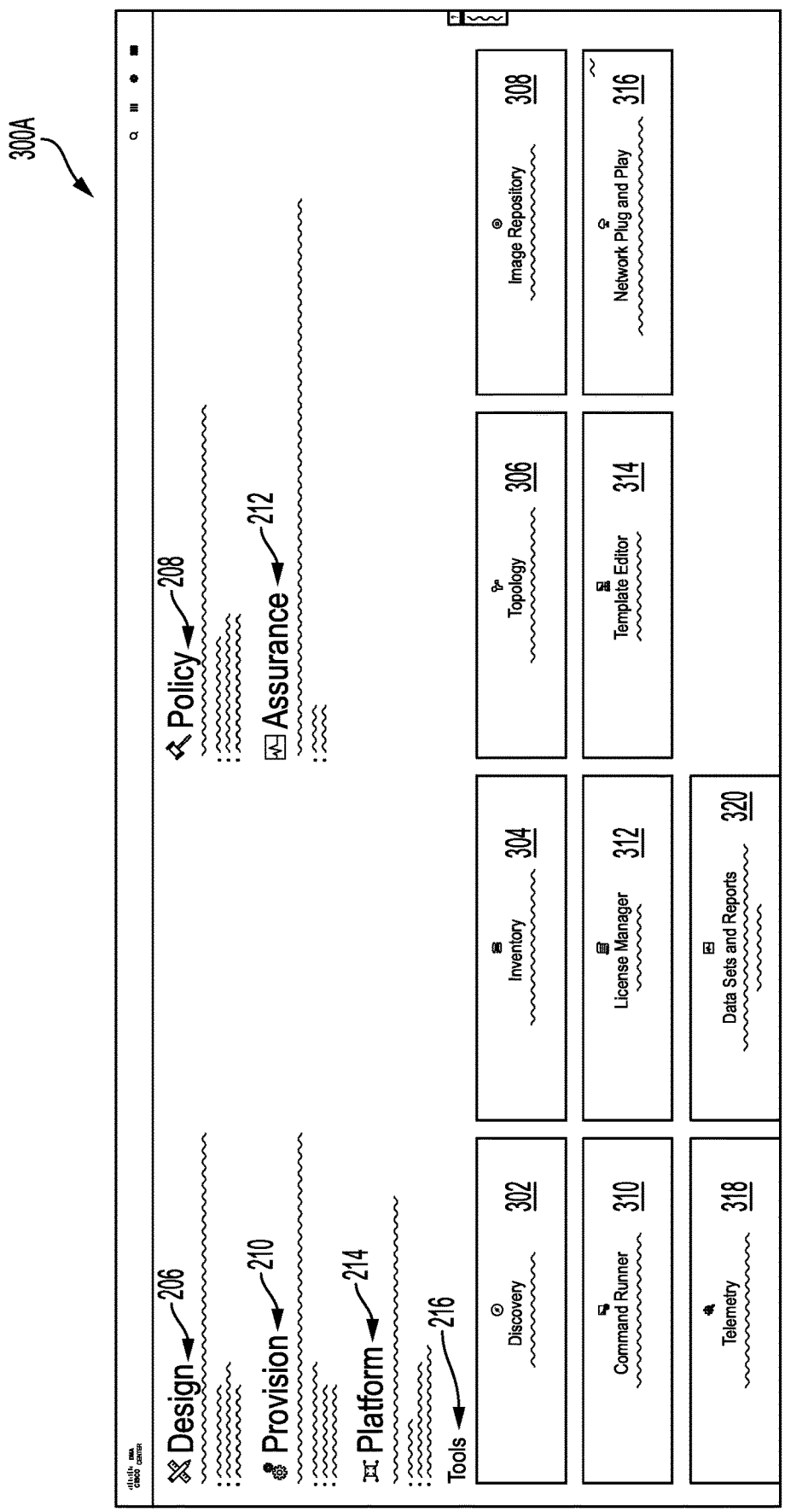
FIGS. 3A-3I illustrate examples of graphical user interfaces for a network management system in accordance with some embodiments.

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

A network discovery tool 302 for automating the discovery of existing network elements to populate into inventory;

An inventory management tool 304 for managing the set of physical and virtual network elements;

A topology tool 306 for visualizing the physical topology of network elements;

An image repository tool 308 for managing software images for network elements;

A command runner tool 310 for diagnosing one or more network elements based on a CLI;

A license manager tool 312 for administering visualizing software license usage in the network;

A template editor tool 314 for creating and authoring CLI templates associated with network elements in a design profile;

A network PnP tool 316 for supporting the automated configuration of network elements;

A telemetry tool 318 for designing a telemetry profile and applying the telemetry profile to network elements; and A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

Figure 3B:
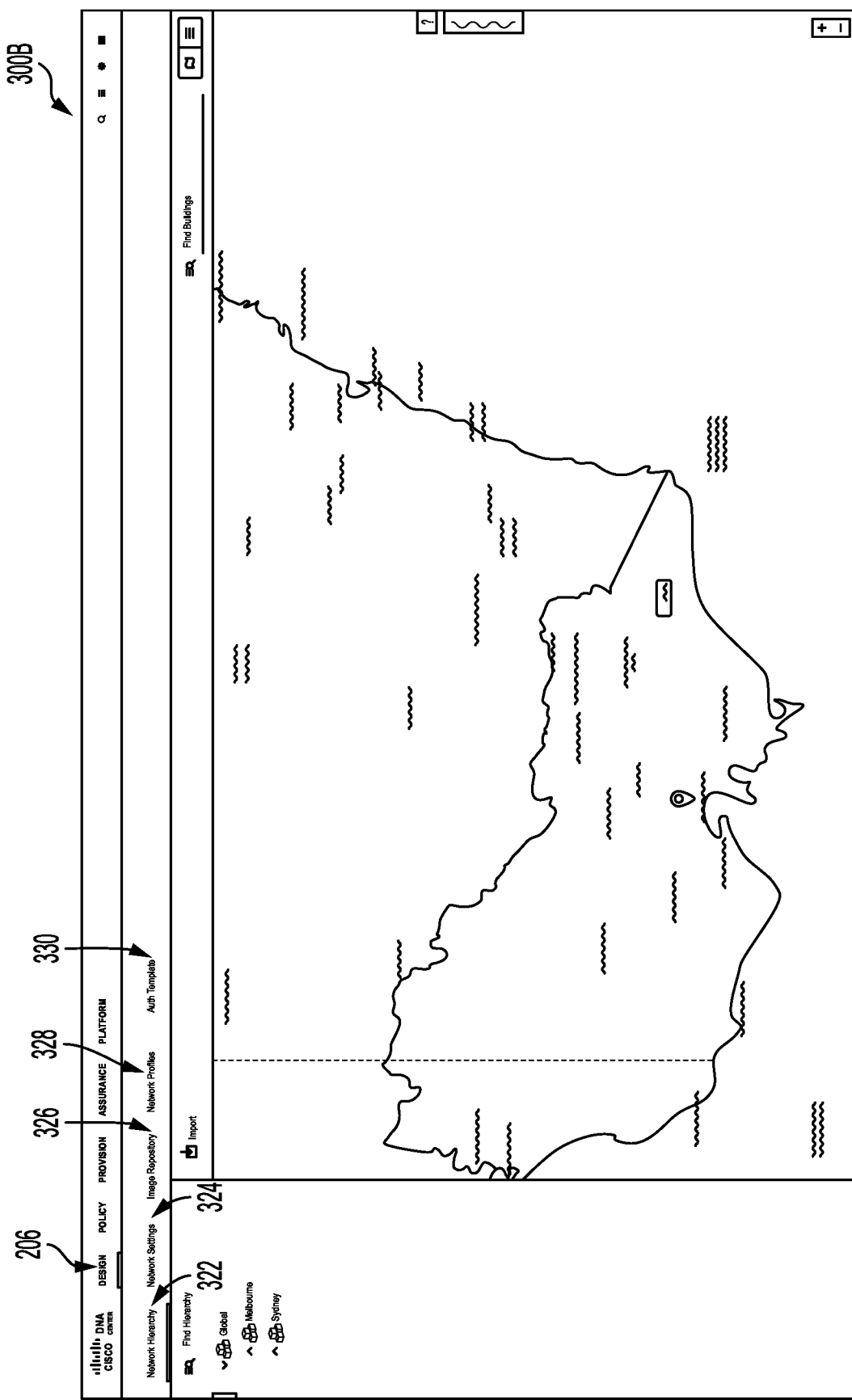

FIG. 3B illustrates a graphical user interface 300B, an example of a landing screen for the design functions 206. The graphical user interface 300B can include user interface elements for various tools and workflows for logically defining an enterprise network. In this example, the design tools and workflows include:

A network hierarchy tool 322 for setting up the geographic location, building, and floor plane details, and associating these with a unique site id;

A network settings tool 324 for setting up network servers (e.g., Domain Name System (DNS), DHCP, AAA, etc.), device credentials, IP address pools, service provider profiles (e.g., QoS classes for a WAN provider), and wireless settings;

An image management tool 326 for managing software images and/or maintenance updates, setting version compliance, and downloading and deploying images;

A network profiles tool 328 for defining LAN, WAN, and WLAN connection profiles (including Service Set Identifiers (SSIDs)); and An authentication template tool 330 for defining modes of authentication (e.g., closed authentication, Easy Connect, open authentication, etc.).

The output of the design workflow 206 can include a hierarchical set of unique site identifiers that define the global and forwarding configuration parameters of the various sites of the network. The provisioning functions 210 may use the site identifiers to deploy the network.

Figure 3C:
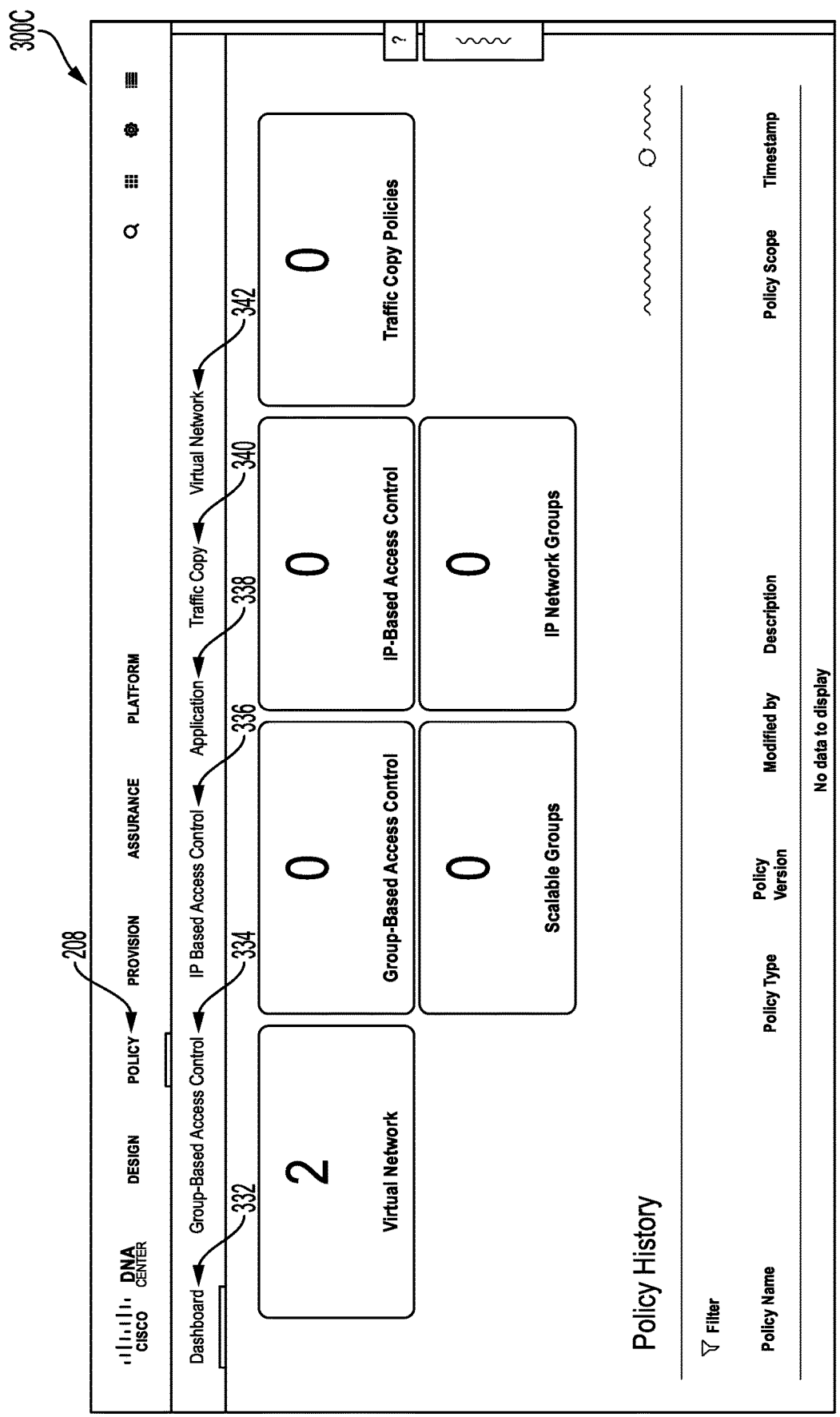

FIG. 3C illustrates a graphical user interface 300C, which is an example of a landing screen for the policy functions 208. The graphical user interface 300C can include various tools and workflows for defining network policies. In this example, the policy design tools and workflows include:

A policy dashboard 332 for viewing virtual networks, group-based access control policies, IP-based access control policies, traffic copy policies, scalable groups, and IP network groups. The policy dashboard 332 can also show the number of policies that have failed to deploy. The policy dashboard 332 can provide a list of policies and the following information about each policy: policy name, policy type, policy version (e.g., iteration of policy which can be incremented each time the policy changes, user who has modified the policy, description, policy scope (e.g., user and device groups or applications that the policy affects), and timestamp;

A group-based access control policies tool 334 for managing group-based access controls or Service Group Access Control Lists (SGACLs). A group-based access control policy can define scalable groups and an access contract (e.g., rules that make up the access control policies, such as permit or deny when traffic matches on the policy);

An IP-based access control policies tool 336 for managing IP-based access control policies. An IP-based access control can define an IP network group (e.g., IP subnets that share same access control requirements) and an access contract;

An application policies tool 338 for configuring QoS for application traffic. An application policy can define application sets (e.g., sets of applications that with similar network traffic needs) and a site scope (e.g., the site to which an application policy is defined);

A traffic copy policies tool 340 for setting up an Encapsulated Remote Switched Port Analyzer (ERSPAN) configuration such that network traffic flow between two entities is copied to a specified destination for monitoring or troubleshooting. A traffic copy policy can define the source and destination of the traffic flow to copy and a traffic copy contract that specifies the device and interface where the copy of traffic is sent; and A virtual network policies tool 343 for segmenting the physical network into multiple logical networks.

The output of the policy workflow 208 can include a set of virtual networks, security groups, and access and traffic policies that define the policy configuration parameters of the various sites of the network. The provisioning functions 210 may use the virtual networks, groups, and policies for deployment in the network.

Figure 3D:
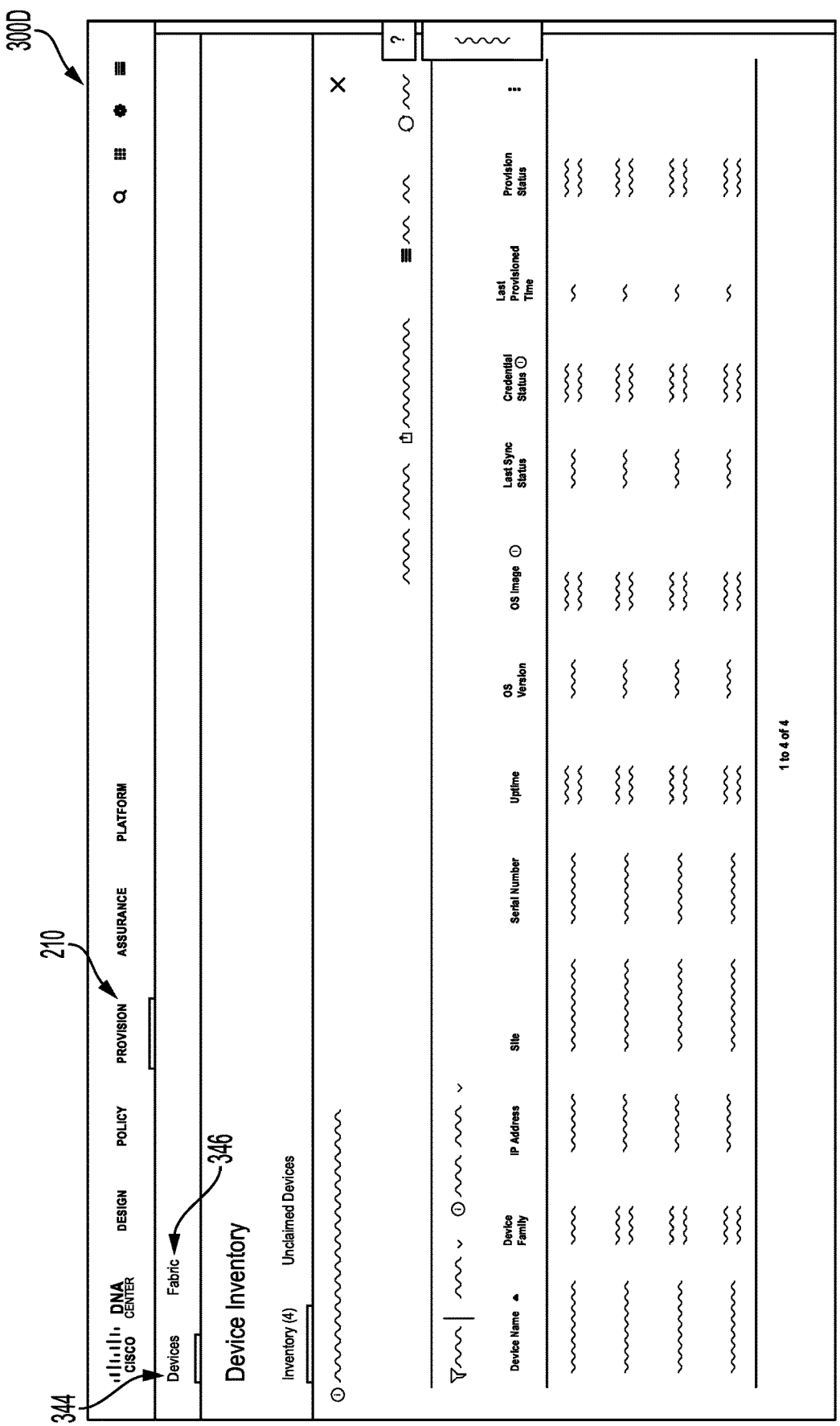

FIG. 3D illustrates a graphical user interface 300D, which is an example of a landing screen for the provisioning functions 210. The graphical user interface 300D can include various tools and workflows for deploying the network. In this example, the provisioning tools and workflows include:

A device provisioning tool 344 for assigning devices to the inventory and deploying the required settings and policies, and adding devices to sites; and A fabric provisioning tool 346 for creating fabric domains and adding devices to the fabric.

The output of the provisioning workflow 210 can include the deployment of the network underlay and fabric overlay, as well as policies (defined in the policy workflow 208).

Figure 3E:
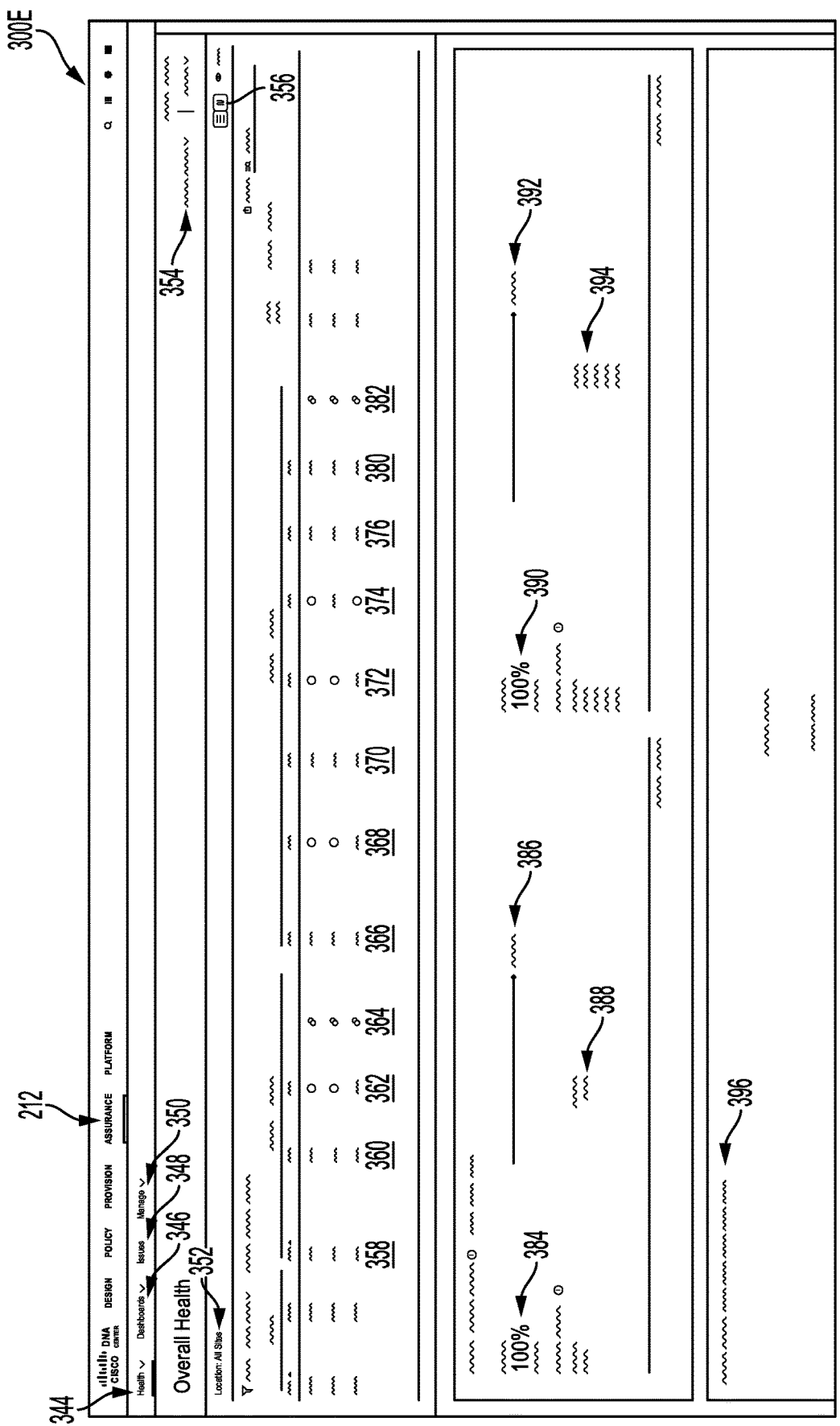

FIG. 3E illustrates a graphical user interface 300E, an example of a landing screen for the assurance functions 212. The graphical user interface 300E can include various tools and workflows for managing the network. In this example, the assurance tools and workflows include:

A health overview tool 344 for providing a global view of the enterprise network, including network infrastructure devices and endpoints. The user interface element (e.g., drop-down menu, a dialog box, etc.) associated with the health overview tool 344 can also be toggled to switch to additional or alternative views, such as a view of the health of network infrastructure devices alone, a view of the health of all wired and wireless clients, and a view of the health of applications running in the network as discussed further below with respect to FIGS. 3F-3H;

An assurance dashboard tool 346 for managing and creating custom dashboards;

An issues tool 348 for displaying and troubleshooting network issues; and

A sensor management tool 350 for managing sensor-driven tests.

The graphical user interface 300E can also include a location selection user interface element 352, a time period selection user interface element 354, and a view type user interface element 356. The location selection user interface element 354 can enable a user to view the overall health of specific sites (e.g., as defined via the network hierarchy tool 322) and/or network domains (e.g., LAN, WLAN, WAN, data center, etc.). The time period selection user interface element 356 can enable display of the overall health of the network over specific time periods (e.g., last 3 hours, last 24 hours, last 7 days, custom, etc.). The view type user interface element 355 can enable a user to toggle between a geographical map view of the sites of the network (not shown) or a hierarchical site/building view (as shown).

Within the hierarchical site/building view, rows can represent the network hierarchy (e.g. sites and buildings as defined by the network hierarchy tool 322); column 358 can indicate the number of healthy clients as a percentage; column 360 can indicate the health of wireless clients by a score (e.g., 1-10), color and/or descriptor (e.g., red or critical associated with a health score 1 to 3 indicating the clients have critical issues, orange or warning associated with a health score of 4 to 7 indicating warnings for the clients, green or no errors or warnings associated with a health score of 8 to 10, grey or no data available associated with a health score of null or 0), or other indicator; column 362 can indicate the health of wired clients by score, color, descriptor, and so forth; column 364 can include user interface elements for drilling down to the health of the clients associated with a hierarchical site/building; column 366 can indicate the number of healthy network infrastructure devices as a percentage; column 368 can indicate the health of access switches by score, color, descriptor, and so forth; column 370 can indicate the health of core switches by score, color, descriptor, and so forth; column 372 can indicate the health of distribution switches by score, color, descriptor, and so forth; column 374 can indicate the health of routers by score, color, descriptor, and so forth; column 376 can indicate the health of WLCs by score, color, descriptor, and so forth; column 378 can indicate the health of other network infrastructure devices by score, color, descriptor, and so forth; and column 380 can include user interface elements for drilling down to the health of the network infrastructure devices associated with a hierarchical site/building. In other embodiments, client devices may be grouped in other ways besides wired or wireless, such as by device type (e.g., desktop, laptop, mobile phone, IoT device or more specific type of IoT device, etc.), manufacturer, model, operating system, and so forth. Likewise, network infrastructure devices can also be grouped along these and other ways in additional embodiments.

The graphical user interface 300E can also include an overall health summary user interface element (e.g., a view, pane, tile, card, container, widget, dashlet, etc.) that includes a client health summary user interface element 384 indicating the number of healthy clients as a percentage, a color coded trend chart 386 indicating that percentage over a specific time period (e.g., as selected by the time period selection user interface element 354), a user interface element 388 breaking down the number of healthy clients as a percentage by client type (e.g., wireless, wired), a network infrastructure health summary user interface element 390 indicating the number of health network infrastructure devices as a percentage, a color coded trend chart 392 indicating that percentage over a specific time period, and a user interface element 394 breaking down the number of network infrastructure devices as a percentage by network infrastructure device type (e.g., core switch, access switch, distribution switch, etc.).

The graphical user interface 300E can also include an issues user interface element 396 listing issues, if any, that must be addressed. Issues can be sorted based on timestamp, severity, location, device type, and so forth. Each issue may be selected to drill down to view a more detailed view of the selected issue.

Figure 3F:
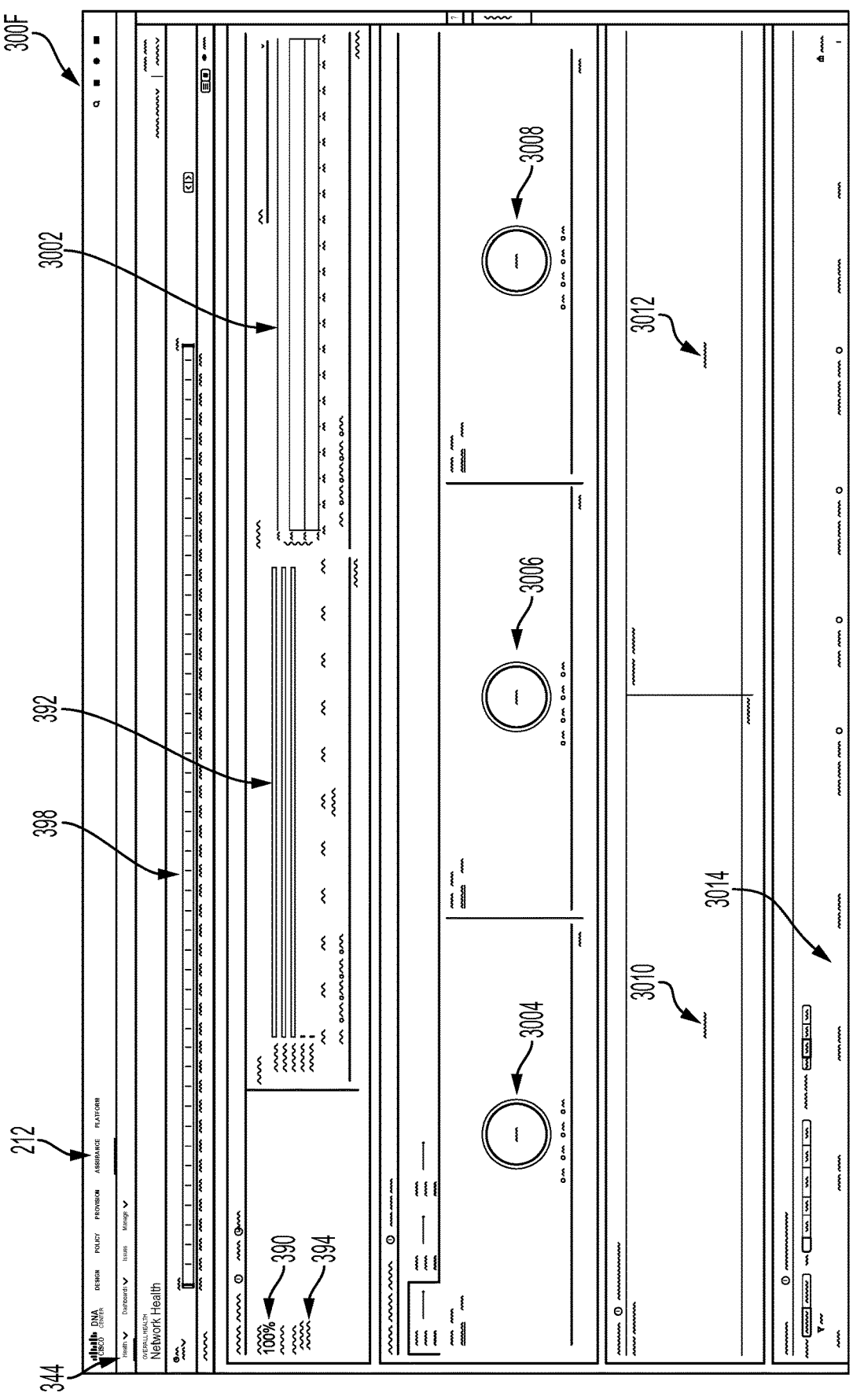

FIG. 3F illustrates a graphical user interface 300F, which is an example of a screen for an overview of the health of network infrastructure devices alone, which may be navigated to, for instance, by toggling the health overview tool 344. The graphical user interface 300F can include a timeline slider 398 for selecting a more granular time range than a time period selection user interface element (e.g., the time period selection user interface element 354). The graphical user interface 300F can also include similar information to that shown in the graphical user interface 300E, such as a user interface element comprising a hierarchical site/building view and/or geographical map view similar to that of the graphical user interface 300E (except providing information only for network infrastructure devices) (not shown here), the number of healthy network infrastructure devices as a percentage 390, the color coded trend charts 392 indicating that percentage by device type, the breakdown of the number of healthy network infrastructure devices by device type 394, and so forth. In addition, the graphical user interface 300F can display a view of the health of network infrastructure devices by network topology (not shown). This view can be interactive, such as by enabling a user to zoom in or out, pan left or right, or rotate the topology (e.g., by 90 degrees).

In this example, the graphical user interface 300F also includes a color coded trend chart 3002 showing the performance of the network infrastructure devices over a specific time period; network health by device type tabs including a system health chart 3004 providing system monitoring metrics (e.g., CPU utilization, memory utilization, temperature, etc.), a data plane connectivity chart 3006 providing data plane metrics, such as uplink availability and link errors, and a control plane connectivity chart 3008 providing control plane metrics for each device type; an AP analytics user interface element including an up and down color coded chart 3010 that provides AP status information (e.g., the number of APs connected to the network, and the number of APs not connected to the network, etc.) and a top number N of APs by client count chart 3012 that provides information about the APs that have the highest number of clients; a network devices table 3014 enabling a user to filter (e.g., by device type, health, or custom filters), view, and export network device information. A detailed view of the health of each network infrastructure device can also be provided by selecting that network infrastructure device in the network devices table 3014.

Figure 3G:
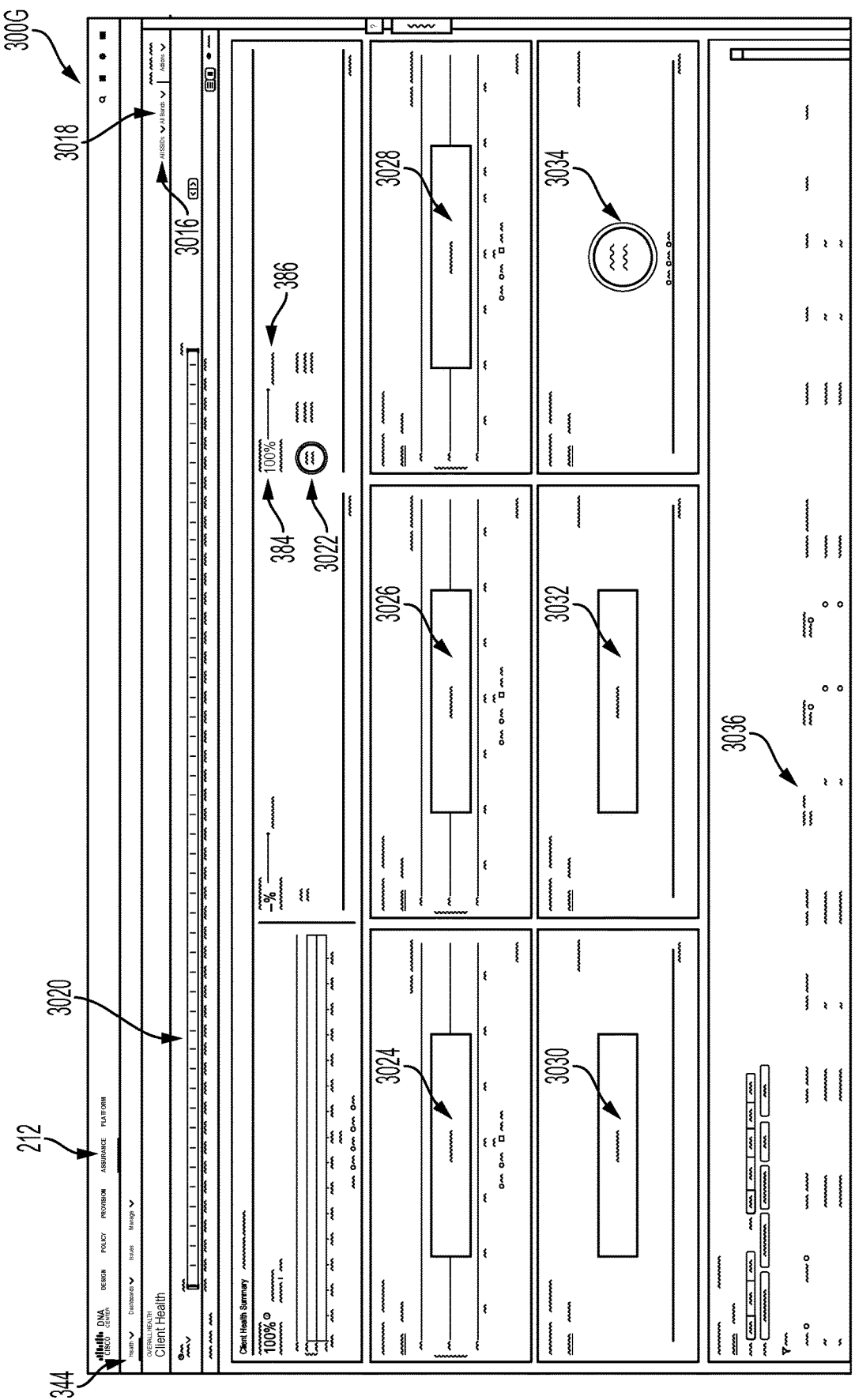

FIG. 3G illustrates a graphical user interface 300G, which is an example of a screen for an overview of the health of client devices, which may be navigated to, for instance, by toggling the health overview tool 344. The graphical user interface 300G can include an SSID user interface selection element 3016 for viewing the health of wireless clients by all SSIDs or a specific SSID, a band frequency user interface selection element 3018 for viewing the health of wireless clients by all band frequencies or a specific band frequency (e.g., 2.4 GHz, 5 GHz, etc.), and a time slider 3020 that may operate similarly to the time slider 398.

The graphical user interface 300G can also include a client health summary user interface element that provides similar information to that shown in the graphical user interface 300E, such as the number of healthy clients as a percentage 384 and a color coded trend chart 386 indicating that percentage over a specific time period for each grouping of client devices (e.g., wired/wireless, device type, manufacturer, model, operating system, etc.). In addition, the client health summary user interface element can include a color-coded donut chart that provides a count of poor (e.g., red and indicating a client health score of 1 to 3), fair (e.g., orange and indicating a client health score of 4 to 7), good (e.g., green and indicating a health score of 8 to 10), and inactive (e.g., grey and indicating a health score that is null or 0) client devices. The count of client devices associated with each color, health score, health descriptor, and so forth may be displayed by a selection gesture directed toward that color (e.g., tap, double tap, long press, hover, click, right-click, etc.).

The graphical user interface 300G can also include a number of other client health metric charts in all sites or a selected site over a specific time period, such as:
  Client onboarding times 3024;
  Received Signal Strength Indications (RSSIs) 3026;
  Connectivity signal-to-noise ratios (SNRs) 3028;
  Client counts per SSID 3030;
  Client counts per band frequency 3032;
  DNS requests and response counters (not shown); and
  Connectivity physical link state information 3034 indicating the distribution of wired client devices that had their physical links up, down, and had errors.

In addition, the graphical user interface 300G can include a client devices table 3036 enabling a user to filter (e.g., by device type, health, data (e.g., onboarding time>threshold, association time>threshold, DHCP>threshold, AAA>threshold, RSSI>threshold, etc.), or custom filters), view, and export client device information (e.g., user identifier, hostname, MAC address, IP address, device type, last heard, location, VLAN identifier, SSID, overall health score, onboarding score, connection score, network infrastructure device to which the client device is connected, etc.). A detailed view of the health of each client device can also be provided by selecting that client device in the client devices table 3036.

Figure 3H:
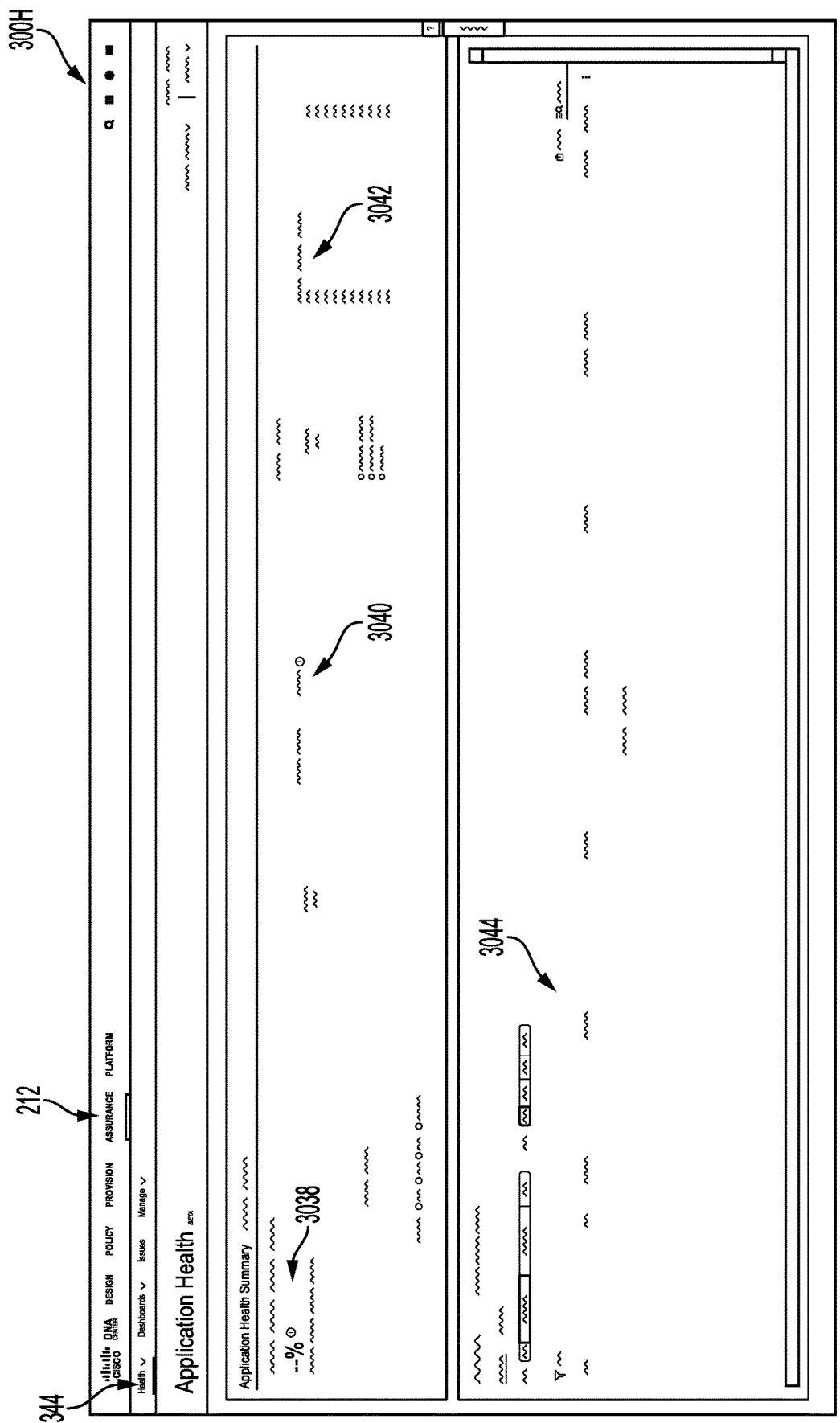

FIG. 3H illustrates a graphical user interface 300H, an example of a screen for an overview of the health of applications, which may be navigated to, for instance, by the toggling the health overview tool 344. The graphical user interface 300H can include application health summary user interface element including a percentage 3038 of the number of healthy applications as a percentage, a health score 3040 for each application or type of application (e.g., business relevant, business irrelevant, default; HTTP, VoIP, chat, email, bulk transfer, multimedia/streaming, etc.) running in the network, a top number N of applications by usage chart 3042. The health score 3040 can be calculated based on an application's qualitative metrics, such as packet loss, network latency, and so forth.

In addition, the graphical user interface 300H can also include an applications table 3044 enabling a user to filter (e.g., by application name, domain name, health, usage, average throughput, traffic class, packet loss, network latency, application latency, custom filters, etc.), view, and export application information. A detailed view of the health of each application can also be provided by selecting that application in the applications table 3044.

Figure 3I:
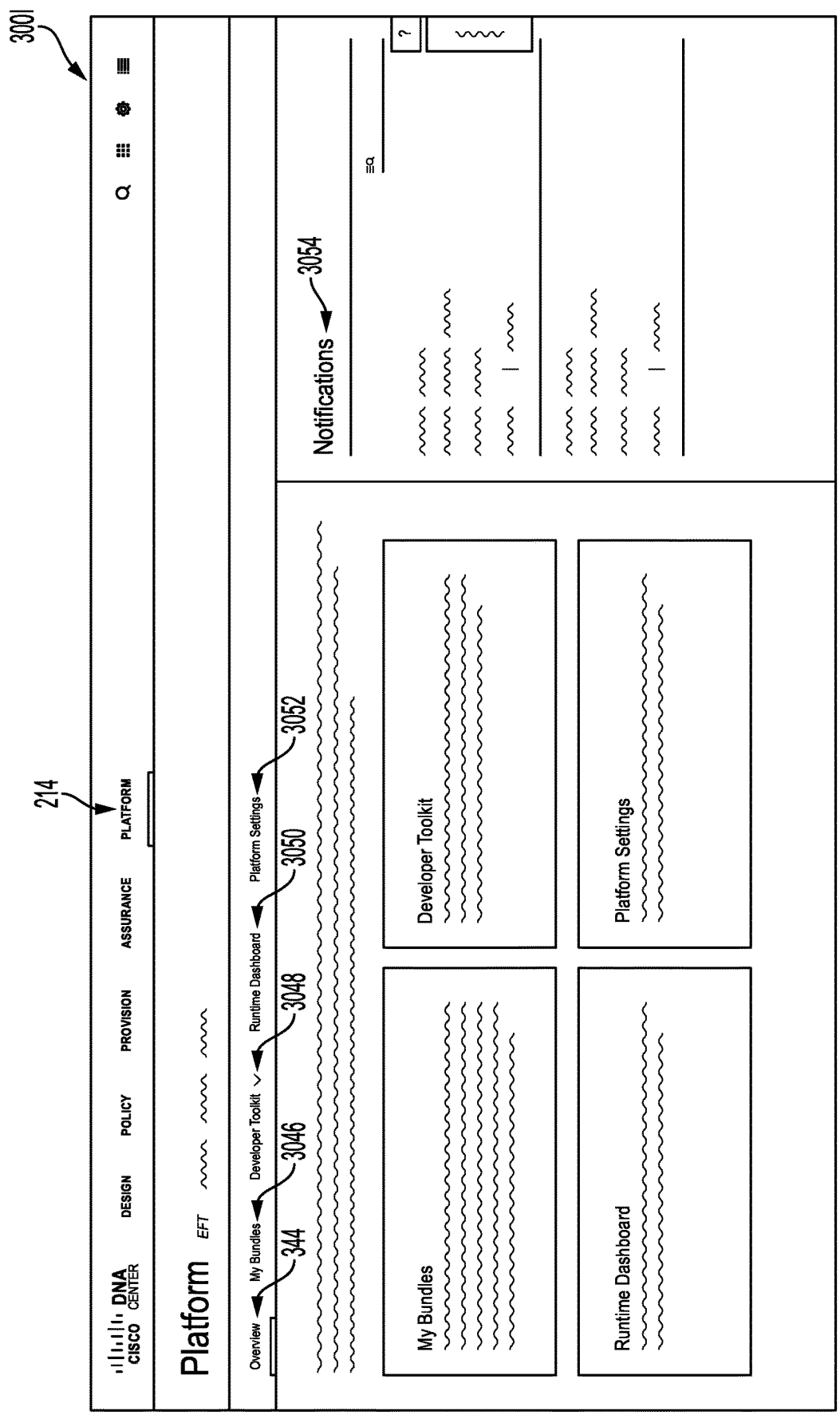

FIG. 3I illustrates an example of a graphical user interface 300I, which is an example of a landing screen for the platform functions 210. The graphical user interface 300I can include various tools and workflows for integrating with other technology systems. In this example, the platform integration tools and workflows include:
  A bundles tool 3046 for managing packages of domain-specific APIs, workflows, and other features for network programming and platform integration;
  A developer toolkit 3048 for accessing an API catalog listing the available APIs and methods (e.g., GET, PUT, POST, DELETE, etc.), descriptions, runtime parameters, return codes, model schemas, and so forth. In some embodiments, the developer toolkit 3048 can also include a "Try It" button to permit a developer to experiment with a particular API to better understand its behavior;
  A runtime dashboard 3050 for viewing and analyzing basic metrics or API and integration flow usage;
  A platform settings tool 3052 to view and set global or bundle-specific settings that define integration destinations and event consumption preferences; and
  A notifications user interface element 3054 for presenting notifications regarding the availability of software updates, security threats, and so forth.

Returning to FIG. 2, the controller layer 220 can comprise subsystems for the management layer 220 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network control platform 230 can provide the design functions 206, the provisioning functions 210, the policy functions 208, and/or the assurance functions 212. In addition, the network control platform 230 can include tools and workflows for discovering switches, routers, wireless controllers, and other network infrastructure devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices, including syslog, SNMP, NetFlow, Switched Port Analyzer (SPAN), and streaming telemetry, among others. The network data platform 224 can also collect use contextual information.

In some embodiments, one or more Cisco DNA™ Center appliances can provide the functionalities of the management layer 210, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network infrastructure devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay may use any topology and routing protocol.

In some embodiments, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the physical underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routes and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node 110 may implement the Locator/Identifier Separation Protocol (LISP) to communicate with one another and with the management cloud 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can comprise network infrastructure devices, such as switches and routers 110, 122, 124, and 126 and wireless elements 108 and 128 and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4:
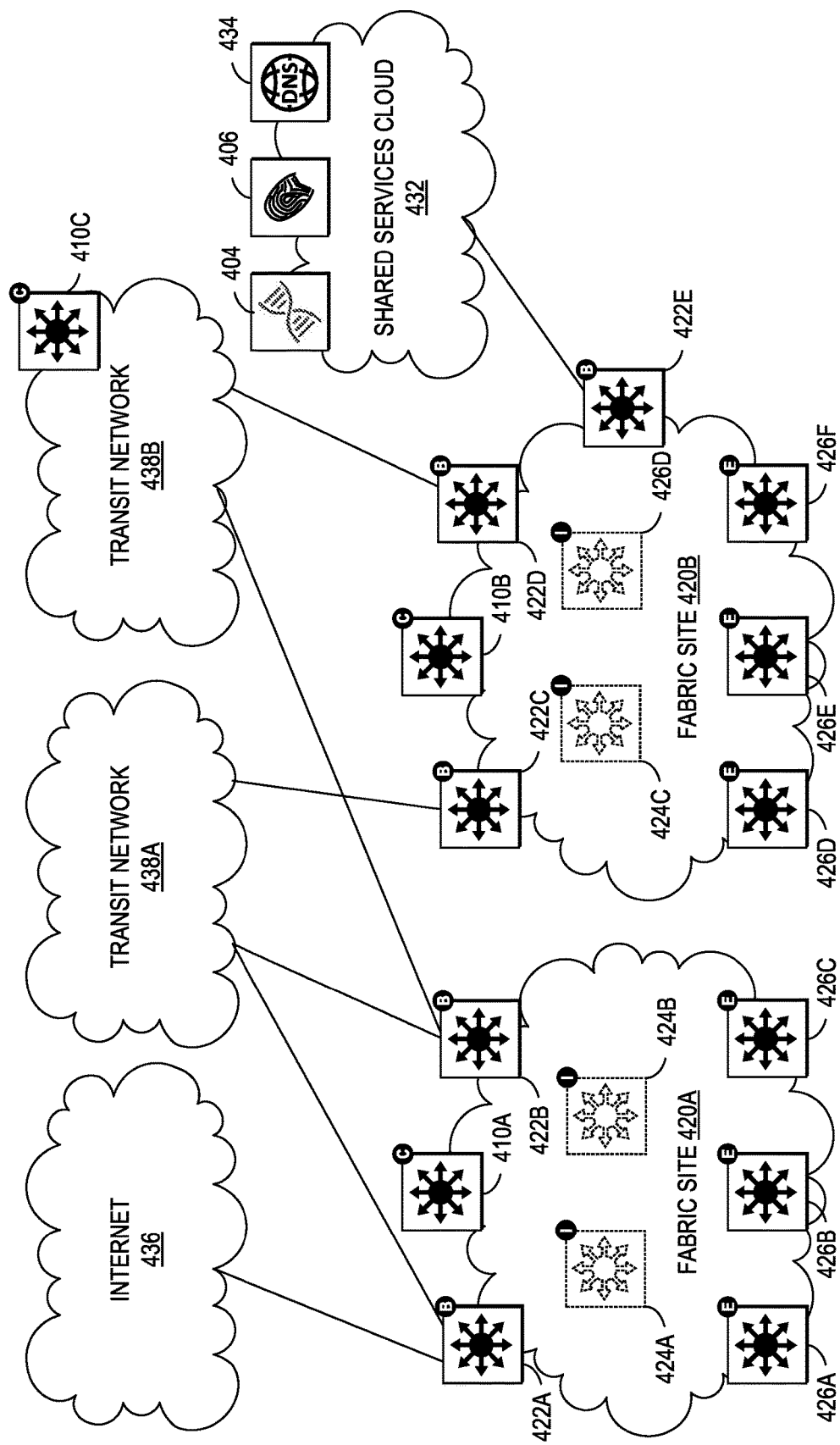
FIG. 4 illustrates an example of a physical topology for a multi-site enterprise network in accordance with some embodiments.

FIG. 4 illustrates an example of a physical topology for a multi-site enterprise network 400. In this example, the network fabric comprises fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network should be cable of carrying endpoint context information (e.g., VRF, SGT) across the network. Otherwise, a re-classification of the traffic may be needed at the destination site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can comprise one or more network controller appliances 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hairpinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

Figure 5:
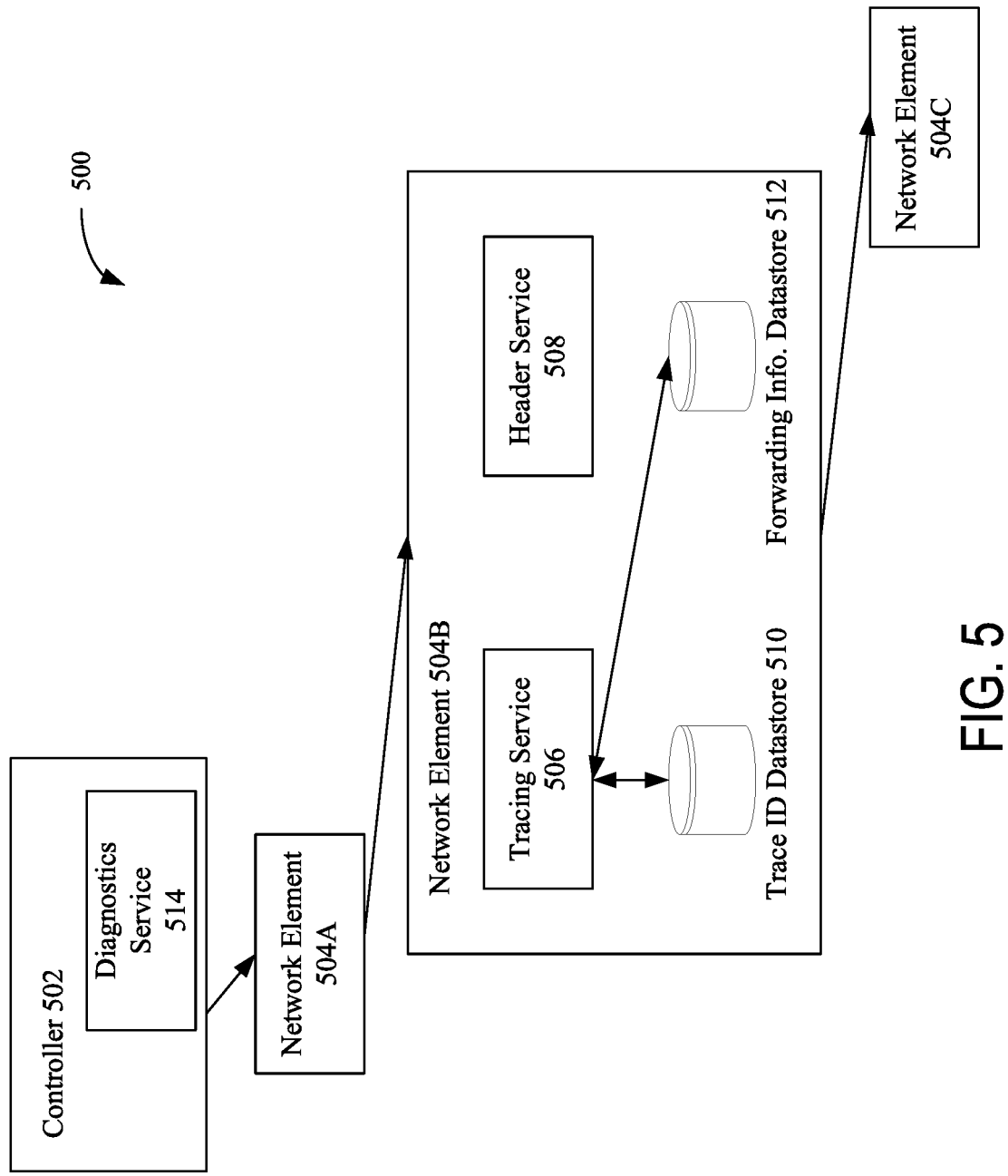
FIG. 5 illustrates an example schematic diagram of a network environment that traces traffic through a network in order to diagnose packet forwarding issues, in accordance with some embodiments.

FIG. 5 illustrates an example schematic diagram of a network environment that traces traffic through a network in order to diagnose packet forwarding issues, in accordance with some embodiments. System 500 can include controller 502 in communication with multiple network elements (e.g., switches, routers, etc.), such as network element 504A, network element 504B, and network element 504C. The controller and network elements can be part of a network that receives and transmits packets to and from network elements. If packets that are part of the network's traffic experience any issues, system 500 can identify where those issues are happening and what those issues are.

For example, system 500 can generalize traffic data and completely automate the data collection and/or the identification of maintenance issues. This can be done through tracing the packet through tracing service 506, adding a unique identifier to a packet header by header service 508, collecting data (e.g., Trace ID datastore 510 and forwarding information datastore 512) and, based on the collected data, determining why the packet is forwarded a certain way within the network (by diagnostics service 514). In some embodiments, diagnostics service 514 can make some determinations and projections based on the packet tracing and then coordinate with the network elements to correct any issues. Since some example embodiments, system 500 can even present an overview of what needs to be addressed by the user. For example, some issues the packet can experience is that the packet could be swept from one device to another, it could be routed an undesirable way, it could have some internal solution, or need to be re-encapsulated. Some hardware and/or software mechanisms are presented that can collect and use tracing data in a convenient manner to the end user so that the end user may correlate issues, devices, etc. faster.

Enterprise networks, such as that that can be represented by system 500, may often have problems debugging packet issues. For example, in order to debug a packet issue (such as a forwarding issue, for example), information about the packet and the packet's behavior from each network element needs to be collected from each network element. In other words, packet information needs to be collected from each switch, router, etc. (e.g., network elements 504A, 504B, and 504C) that was part of the packet's routing path, which can be problematic since each network element can have different types, formatting, etc. of data. Debugging packet issues, then, can take days to months to complete, especially as the state of system 50 changes as more network elements are added, removed, or replaced.

System 500 can solve these issues by instantaneously receiving and aggregating all the information needed to debug a packet issue. For example, the aggregated information collected by diagnostics service 514 can be analyzed to identify drop issues/reasons and where the packet has been forwarded to/from. System 500 can determine why the packet was forwarded the way it was in the network (e.g., why the packet behaved in a certain way). Using mechanisms based on hardware capabilities to get information, system 500 can quickly correlate packet behavior in order to diagnose packet issues. The diagnosis can include which network element experienced the issue, and can identify what the issue is.

Figure 6:
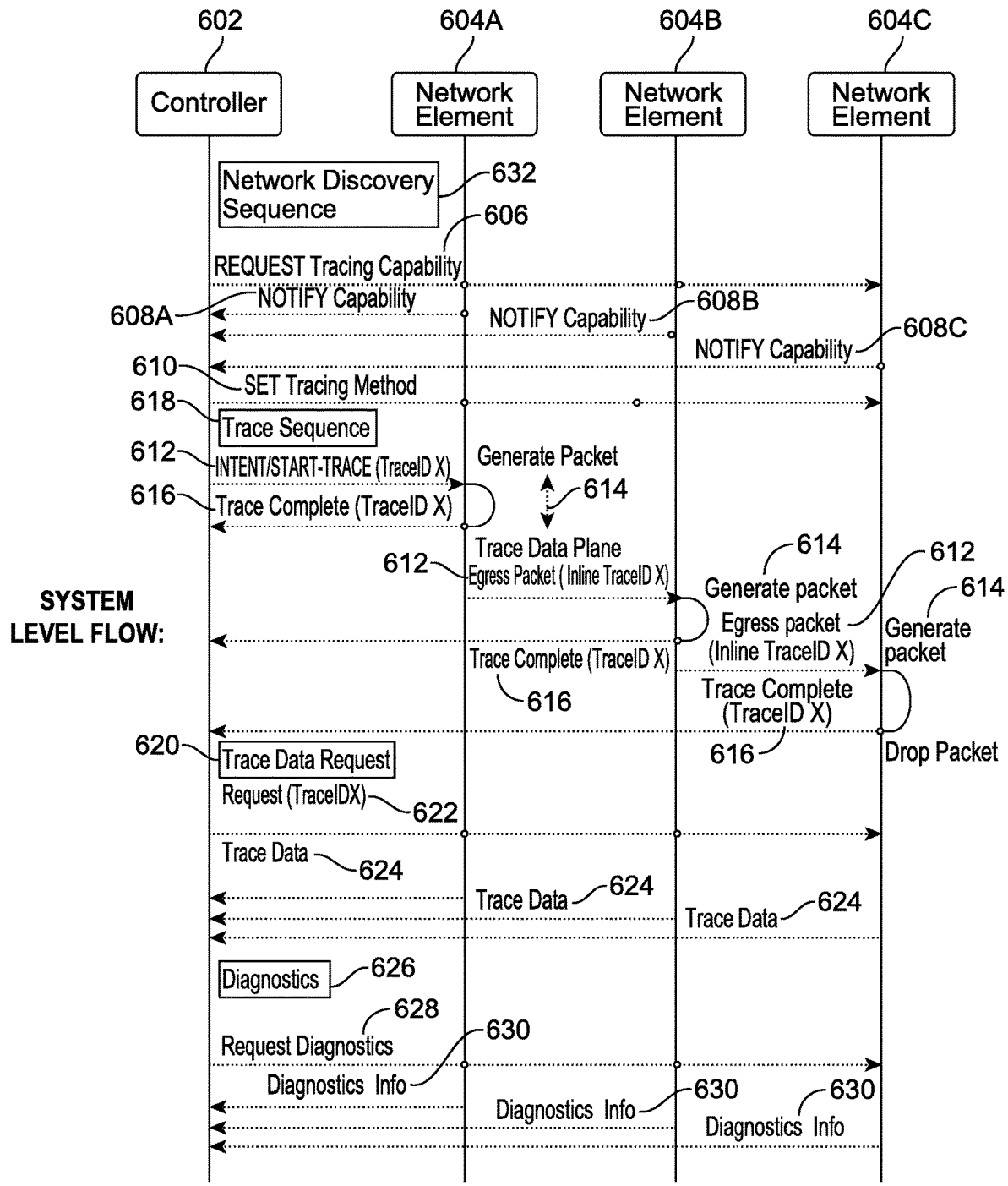
FIG. 6 illustrates a system level flow diagram in accordance with some embodiments.

FIG. 6 illustrates a system level flow diagram in accordance with some embodiments. Controller 602 can be similar to controller 502, and network elements 604A, 604B, and 604C can be similar to network elements 504A, 504B, and 504C. Example systems can have multiple network elements, and each network element can have different capabilities. While FIG. 5 as well as FIG. 6 shows multiple network elements in communication with a controller element, in some embodiments the controller can be just another network element (either part of the network forwarding elements or not part of the network forwarding elements).

A network discovery sequence 632 can begin by identifying one or more capabilities of the network elements (e.g., network element 604A, network element 604B, and network element 604C). Each network element may have different capabilities. For example, some capabilities may be indicators of which elements can be traced by the network element and what network path can be traced.

Controller 602 may, for example, request tracing capabilities of the network elements. Negotiating capabilities may include, but is not limited to, determining a type of packet a network element can capture; determining whether the type of packet can add a tracing header; and determining a type of tracing data the network element can produce. For example, controller 602 can, after sending a request 606 to all the network elements, receive from network element 604A notification 608A its capabilities, such as what information network element 604A can produce, what kind of packet it can trace, and other general information (e.g., whether it can do IPv4 or IPv6, for example). Controller 602 can receive similar notifications 608B and 608C from network elements 604B and 604C, respectively. In some embodiments, each network element may also be informed which network device is controller 602—controller 602 could be a starting network element or an external controller. The controller information may in some embodiments be stored on the network element (e.g., network element 604A) locally.

In some embodiments, controller 602 may then set the tracing method 610. For example, based on receiving a query from controller 602 setting the tracing method 610, in some embodiments the network elements can self-configure itself to add tracing headers in response to receiving packets.

Once the network's discovery sequence is done, the system can initiate, as shown by network element 504B in FIG. 5, tracing service 506 and diagnostics service 514. For example, trace sequence 618 can be initiated. A unique identifier, such as a Trace ID, can be associated with a packet by controller 502 (or 602) or by a network element as the packet goes through that network element. In other words, the Trace ID can be associated with the packet as it goes through its network path. For example, once tracing has been initiated 612A by controller 602, network element 604A can define the Trace ID for a received packet, which can be used as the packet travels to network element 604B and network element 604C. Network element 604A can also maintain a database (similar to Trace ID database 510 in FIG. 5) that stores the Trace ID for the packet.

Once we have identified a packet to trace, and the TraceID is available, then tracing can begin (e.g., by tracing service 506). Independently, each network element will trace the packet. So, for example, the controller 602 and/or network element (e.g., network element 604A) can generate a packet 614 and then forward the outgoing packet after the packet has undergone a header transformation (including or inserting the TraceID). In some embodiments, the actual outgoing packet can be activated on each of the network elements. When the packet is transmitted to another network element (e.g., network element 604B), based on the capabilities negotiated, the Trace ID is included within the negotiated packet format.

For example, extra headers including the Trace ID can be added to the packet (in addition to the packet's normal headers). In some embodiments this header can also be negotiable. If the packet is sent to another network element, based on the capabilities that have been negotiated, the Trace ID and/or tracing header can be put in the negotiated packet format. For example, the extra tracing header can be used for the purpose of tracing—thus, if the packet is sent to a network element further down the network path, then the packet can undergo further similar transformations (tracing header including Trace ID) until it reaches its final destination or exits the network. In any case, the Trace ID travels with the packet.

In some embodiments, as the Trace ID travels with the trace header of the packet to a network element, for each of the network elements, the Trace ID can be extracted from the packet. The additional headers can be removed, and the packet can be retraced once it is sent to another network element (e.g., the headers can be inserted and removed at each network element in order to accommodate each network element). This process can continue for all of the network elements.

As one example, in a Software Defined Access environment, which can be based on IP/VxLAN fabric, the client traffic flow can be identified at an Ingress Fabric Edge and the packet can be marked in the Outer IP header with IP Options and Trace Id. In the rest of the fabric, the outer IP header Options and Trace Id can be used to identify the unique flow. Based on this, diagnostics can be generated on each Fabric Core and Fabric Edge device in the packet path. It can be used as a health check for client flows after provisioning/on-boarding the client.

Using tracing headers that include a Trace ID allows the system to not care about the forwarding technology. Thus, any forwarding technology can be used throughout the path of the traffic through the network, so there can be multiple transformations of the packet. For example, trace headers can be added to original packets on a hop by hop basis. At network element 604A, network element 604A can encapsulate an original packet to be sent to network element 604B. Network element 604A will capture that encapsulation information, and will add a trace header to that original packet that works with network element 604A's forwarding technology. When the modified packet (original packet+trace header) reaches network element 604B, another trace header is added (and in some embodiments the previous header is removed) that works with network element 604B's forwarding technology (e.g., the TraceID is noted and at that time the egress packet will be analyzed in order to add the correct trace header outbound from network element 604B), and in this way the TraceID within the trace header will trace the packet hop by hop as it travels to its destination.

Forwarding information associated with the Trace ID may be stored locally on each network element, and then sent (e.g., as a completed trace 616) to controller 602 immediately, on a periodic basis (e.g., every 30 seconds), or in response to a request for the trace data from controller 602. Controller 602 can then consolidate the information. For example, a trace data request 620 sequence can begin when controller 602 requests the trace data (622) from network elements 604A, 604B, and 604C. In response, each network element can then send 624 to controller 602 its locally stored trace data (e.g., forwarding information along with its associated Trace ID).

The trace data can then be aggregated by controller 602 and analyzed by diagnostics sequence 626. For example, based on the capabilities of each network element, the trace data can be analyzed to identify what has gone wrong with the packet. In some embodiments, controller 602 can request 628 any diagnostics information (e.g., capabilities) it needs in addition to the trace data. In response, each network element can send 630 controller 602 its requested diagnostics information. Diagnostics service 514 (see FIG. 5) can analyze the trace data and diagnostics information with one or more models that can be applied to the trace data and diagnostics information to find a best fit for certain packet issues.

Figure 7:
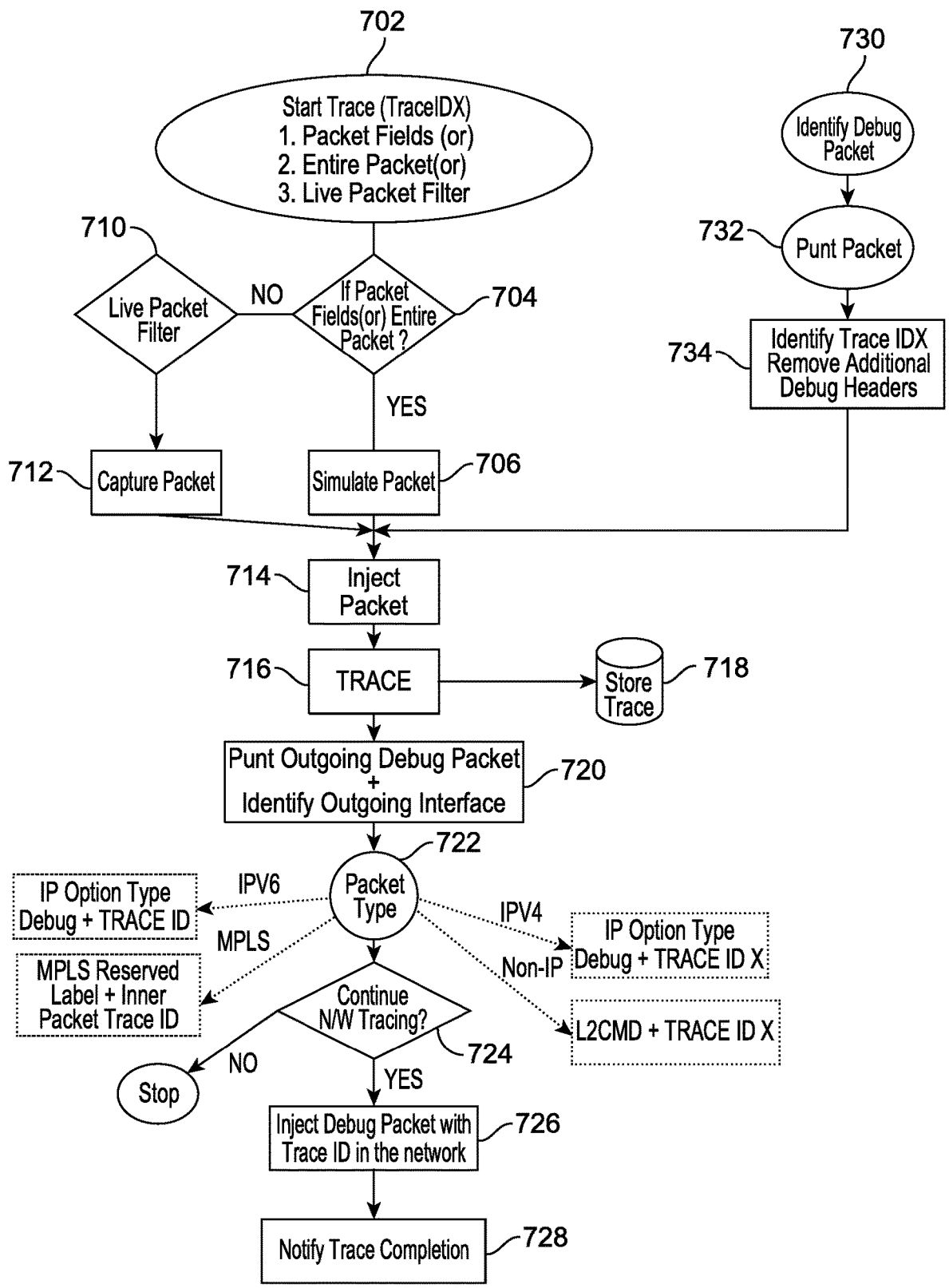
FIG. 7 illustrates a network element flow diagram in accordance with some embodiments.

FIG. 7 illustrates a network element flow diagram in accordance with some embodiments. In some embodiments, such as that shown in FIG. 7, passive traffic can be traced as well as, or instead of, active traffic. FIG. 7, for example, shows how a packet can be captured (active flow) or simulated (passive flow). Based on the intent of the diagnostics service 514 (either to trace an active or a passive flow), system 500 can start a packet trace with a unique Trace ID (710). The trace can be started by defining packet fields (passive), an entire packet (passive), or a live packet filter (active).

If the intent is to trace a passive flow (704), then a packet can be simulated. For example, multiple techniques and capabilities can trace passive flows. Passive flows can be traced, for example, when the network is initially being deployed. In that instance, there wouldn't be any active flows to trace. Accordingly, if there are any flows that are desired or needed to be properly debugged in the network, the packets can be pseudo injected into one or more network elements. For example, the system (for example, the controller 502) can generate a simulated packet (706) and then inject (708) the simulated packet into network element 504B. In that way the system will not have to wait until network element 504B has a passive flow through it to catch any packet issues. Controller 502 can specify the parameters of the packets it is interested in. These parameters can be capabilities of network elements that need to be tested. If a packet is generated that matches those parameters, controller 502 can trace its path through the network and identify any issues that may arise. The simulated packet can be injected (714) into the hardware of a network device, such as network element 504B.

If the intent is to trace an active flow, then a live packet filter can be applied (710) that captures the packet (712). For example, network element 504B can capture a packet that has been routed to it (see 714).

Tracing information can be captured by network element 504B (716), and the tracing information can be modelled and stored (718) in a local database of network element 504B (e.g., Trace ID datastore 510 and forwarding information datastore 512). For example, the tracing information can include any data that's part of the trace itself, such as, but not limited to: the incoming interface; the incoming packet; the forwarding mode (e.g., bridged/routed/tunneled and/or tunnel type/MPLS Forwarded (or) Open Flow Table ID etc.); packet recirculation (if any) and data for each recirculation; packet drops (if any) with reasons; outgoing interfaces for each copy; outgoing packet for each copy of the packet (e.g., capturing the outgoing packet will indicate the exact packet transformation); and the time stamp for the trace. The tracing information can in some embodiments include more detailed information, such as, but not limited to: logical interface Association→(e.g., VLAN/Tunnel Interface/Client Interface etc.); packet lookup sequences with keys and results; packet rewrite metadata; adjacency information; segmentation identification (e.g., VLAN/VRF/VNI/ etc.); policy information; security identification; packet punt to slow path, if any, and with reasons; etc. This can be data applicable to any type of hardware, can be data related to packet forwarding, and can be vendor specific information for each network element. For example, vendor specific can include, but is not limited to: adjacency identifications; internal logical interfaces; lookup sequences and resolution logic; internal QoS identification; and any other vendor specific information which will aid in instant diagnostics. Vendor specific information can define attributes specific to the vendors of the network elements. And can be especially helpful for networks where the network elements are from many different vendors.

Network element 504B can punt an outgoing debug packet and identify the outgoing interface (720). The debug packet can be a packet sent to controller 502 that includes the tracing information above. The tracing information, for a packet across the network elements, can provide enough data to triage a packet forwarding issue instantly. The diagnostics can optionally be centralized and/or distributed based on the capability of the network elements. For example, diagnostics service 514 can run on controller 502 or on a network element itself (e.g., network element 504B). The system may provide enough information for a user to diagnose for themselves any packet forwarding issues, and/ or may provide its own diagnostic about the issue and how to fix it. In some embodiments, plugins can further aid in classifying and diagnosing the problem. In some embodiments, additional diagnostics can be requested from the device if local network element diagnostics are supported.

Network element 504B can modify the outgoing packet with the Trace ID and the tracing header based on packet type (722). For example, the packet can be modified to add the tracing header, which can include the Trace ID. Moreover, the tracing header can be customized to a packet type supported by the next network element (e.g., network element 504C). If tracing is to be continued to another node (724), then based on identifying the outgoing interface and the negotiated capabilities (IPv4, IPv6, etc. packet types), the appropriate trace header can be injected into the packet in order to communicate the Trace ID (726). If network tracing is enabled, then the packet can be injected into the network with the Trace ID and the controller can be notified that the trace has been completed on the node (728).

The other network element (e.g., network element 504C) can receive the modified packet. The tracing header can enable network element 504C to identify the Trace ID. And once that has been identified (730), network element 504C can perform the same tracing as network element 504B. Packets are punted to the CPU to trigger the network element 504C to do the tracing for this packet (732). The incoming port can be identified, the Trace ID can be removed as well as the tracing header (so that a new tracing header can be inserted that's personalized for the next network element) (734). Punting the packets can cause network element 504C to perform steps 714-728, continuing the above process until the packet has reached its final destination or exits the network.

In the current era of automated provisioning of networks, users and policies, it is extremely critical that packet forwarding diagnosis is also automated and instantaneous. The proposed innovation accelerates the trouble shooting process for a feature agnostic wide range of packet forwarding use cases. It also enables further innovation that ensures applications are diagnosing networks with less manual intervention.

Figure 8A:
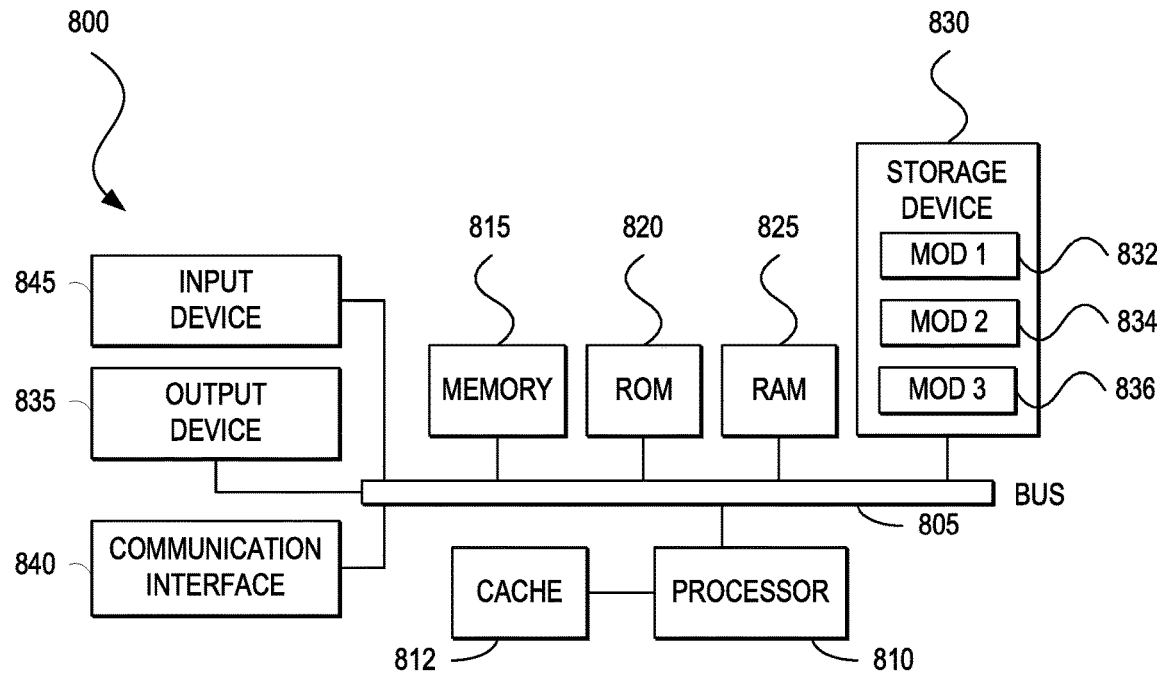
FIGS. 8A and 8B illustrate examples of systems in accordance with some embodiments.
Figure 8B:
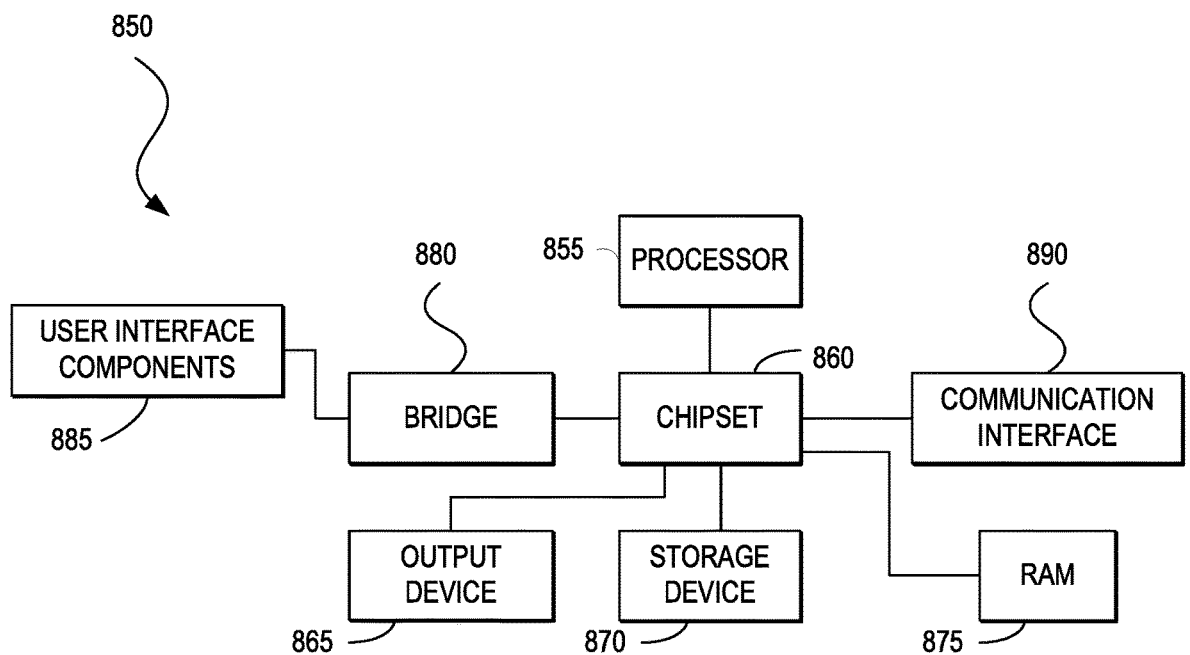

FIG. 8A and FIG. 8B illustrate systems in accordance with various embodiments. The more appropriate system will be apparent to those of ordinary skill in the art when practicing the various embodiments. Persons of ordinary skill in the art will also readily appreciate that other systems are possible.

FIG. 8A illustrates an example of a bus computing system 800 wherein the components of the system, such as that illustrated in FIG. 5, are in electrical communication with each other using a bus 805. The computing system 800 can include a processing unit (CPU or processor) 810 and a system bus 805 that may couple various system components including the system memory 815, such as read only memory (ROM) 820 and random access memory (RAM) 825, to the processor 810. The computing system 800 can include a cache 812 of high-speed memory connected directly with, in close proximity to, or integrated as part of the processor 810. The computing system 800 can copy data from the memory 815, ROM 820, RAM 825, and/or storage device 830 to the cache 812 for quick access by the processor 810. In this way, the cache 812 can provide a performance boost that avoids processor delays while waiting for data. These and other modules can control the processor 810 to perform various actions. Other system memory 815 may be available for use as well. The memory 815 can include multiple different types of memory with different performance characteristics. The processor 810 can include any general purpose processor and a hardware module or software module, such as module 1 832, module 2 834, and module 3 836 stored in the storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

The storage device 830 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 830 can include the software modules 832, 834, 836 for controlling the processor 810. Other hardware or software modules are contemplated. The storage device 830 can be connected to the system bus 805. In some embodiments, a hardware module that performs a particular function can include a software component stored in a computer-readable medium in connection with the necessary hardware components, such as the processor 810, bus 805, output device 835, and so forth, to carry out the function.

FIG. 8B illustrates an example architecture for a chipset computing system 850 that can be used in accordance with an embodiment. The computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, solid state media, and other suitable storage media. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the computing system 850 can come from any of a variety of sources, machine generated and/or human generated.

The chipset 860 can also interface with one or more communication interfaces 890 that can have different physical interfaces. The communication interfaces 890 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 855 analyzing data stored in the storage device 870 or the RAM 875. Further, the computing system 850 can receive inputs from a user via the user interface components 885 and execute appropriate functions, such as browsing functions by interpreting these inputs using the processor 855.

It will be appreciated that computing systems 800 and 850 can have more than one processor 810 and 855, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for tracing traffic through a network comprising:
   determining, based on a negotiation between a first network element and a second network element, a customized packet type supported by the second network element;
   adding, to a packet received by the first network element, a tracing header to generate a modified packet, wherein the tracing header comprises a unique identifier of the modified packet and is customized to the customized packet type determined based on the negotiation between the first network element and the second network element, and wherein the tracing header is negotiable on a hop by hop basis of a forwarding path of the modified packet based on the tracing header being dynamically transformable into a plurality of different negotiable packet formats supported by corresponding network elements in the forwarding path, the plurality of different negotiable packet formats different from the customized packet format;
   based on the unique identifier, identifying the second network element by tracing the modified packet as it is forwarded to the second network element from the first network element, wherein the modified packet is dynamically transformed into at least one different negotiable packet format of the plurality of different packet formats along the forwarding path between the first network element and the second network element based on a difference in supported capabilities between the first network element and the corresponding network elements in the forwarding path, and is transformed into the customized packet type determined based on the negotiation prior to being received by the second network element;
   collecting forwarding information from the second network element that is associated with the modified packet, wherein the unique identifier of the tracing header of the modified packet is associated with the forwarding information; and
   sending the unique identifier of the tracing header of the modified packet and the forwarding information to a controller in order to diagnose a packet forwarding issue based on determining one or more causes of the packet forwarding issue along the forwarding path of the modified packet between the first network element, the corresponding network elements in the forwarding path, and the second network element, wherein the controller diagnoses the packet forwarding issue based on the forwarding information and the unique identifier of the modified packet as the modified packet is sent to the second network element.

2. The method of claim 1, the method further comprising:
   receiving a query; and
   based on the query, configuring, by the first network element, the first network element to add the tracing header in response to receiving the packet.

3. The method of claim 1, wherein the modified packet is customized to the customized packet type supported by the second network element based on negotiating one or more network element capabilities.

4. The method of claim 3, wherein negotiating one or more network element capabilities comprises:

determining a type of packet the second network element can capture;
determining whether the type of packet can add the tracing header; and
determining a type of tracing data the second network element can produce.

5. The method of claim 1, wherein the packet received by the first network element is a simulated packet, and wherein the tracing is of a passive traffic flow.

6. The method of claim 5, wherein the simulated packet is based on a defined set of packet input parameters.

7. The method of claim 1, further comprising:
based on a received request from the controller, transmitting to the controller from the first network element the collected forwarding information stored locally on the first network element, wherein the controller consolidates the forwarding information with other forwarding information received from other network elements.

8. A first network element comprising:
a memory for maintaining forwarding information concerning packets forwarded to a second network element;
a communications interface for receiving a packet directed to the first network element; and
a processor for executing instructions stored in memory, wherein execution of the instructions by the processor executes:
a header service to:
determine, based on a negotiation between the first network element and the second network element, a customized packet type supported by the second network element;
add, to a packet received by the first network element, a tracing header to generate a modified packet, wherein the tracing header comprises a unique identifier of the modified packet and is customized to
the customized packet type determined based on the negotiation between the first network element and the second network
element, and wherein the tracing header is negotiable on a hop by hop basis of a forwarding path of the modified packet based on the tracing header being dynamically transformable into a plurality of different negotiable packet formats supported by corresponding network elements in the forwarding path, the plurality of different negotiable packet formats different from the customized packet format; and
a tracing service to:
based on the unique identifier, identify the second network element by tracing the modified packet as it is forwarded to the second network element from the first network element, wherein the modified packet is dynamically transformed into at least one different negotiable packet format of the plurality of different packet formats along the forwarding path between the first network element and the second network element based on a difference in supported capabilities between the first network element and the corresponding network elements in the forwarding path, and is transformed into the customized packet type determined based on the negotiation prior to being received by the second network element;
collect forwarding information from the second network element that is associated with the modified packet, wherein the unique identifier of the tracing header of the modified packet is associated with the forwarding information; and
send, to a controller, the unique identifier of the tracing header of the modified packet and the forwarding information in order to diagnose a packet forwarding issue based on determining one or more causes of the packet forwarding issue along the forwarding path of the modified packet between the first network element, the corresponding network elements in the forwarding path, and the second network element, wherein the controller diagnoses the packet forwarding issue based on the forwarding information and the unique identifier of the modified packet as the modified packet is sent to the second network element.

9. The first network element of claim 8, wherein execution of the instructions by the processor executes a configuration service that, based on receiving a query from the controller, self-configures the first network element to add the tracing header in response to receiving the packet.

10. The first network element of claim 8, wherein the modified packet is customized to the customized packet type supported by the second network element based on negotiating one or more network element capabilities.

11. The first network element of claim 10, wherein negotiating one or more network element capabilities includes determining a type of packet the second network element can capture, determining whether the type of packet can add the tracing header, and determining a type of tracing data the second network element can produce.

12. The first network element of claim 8, wherein the packet received is a simulated packet, and wherein the tracing is of a passive traffic flow.

13. The first network element of claim 12, wherein the simulated packet is based on a defined set of packet input parameters.

14. A non-transitory computer-readable medium comprising instructions stored thereon, the instructions executable by one or more processors of a computing system to cause the computing system to:
determine, based on a negotiation between a first network element and a second network element, a customized packet type supported by the second network element;
add, to a packet received by the first network element, a tracing header to generate a modified packet, wherein the tracing header comprises a unique identifier of the modified packet and is customized to the customized packet type determined based on the negotiation between the first network element and the second network element, and wherein the tracing header is negotiable on a hop by hop basis of a forwarding path of the modified packet based on the tracing header being dynamically transformable into a plurality of different negotiable packet formats supported by corresponding network elements in the forwarding path, the plurality of different negotiable packet formats different from the customized packet format;
based on the unique identifier, identify the second network element by tracing the modified packet as it is forwarded to the second network element from the first network element, wherein the modified packet is dynamically transformed into at least one different negotiable packet format of the plurality of different packet formats along the forwarding path between the first network element and the second network element based on a difference in supported capabilities between the first network element and the corresponding network elements in the forwarding path, and is transformed into the customized packet type determined based on the negotiation prior to being received by the second network element;

collect forwarding information from the second network element that is associated with the modified packet, wherein the unique identifier is associated with the forwarding information; and send the unique identifier of the tracing header of the modified packet and the forwarding information to a controller in order to diagnose a packet forwarding issue based on determining one or more causes of the packet forwarding issue along the forwarding path of the modified packet between the first network element, the corresponding network elements in the forwarding path, and the second network element, wherein the controller diagnoses the packet forwarding issue based on the forwarding information and the unique identifier of the modified packet as the modified packet is sent to the second network element.

15. The non-transitory computer-readable medium of claim 14, the one or more processors further causing the computing system to:

receive a query from the controller; and based on the query, configure, by the first network element, the first network element to add the tracing header in response to receiving the packet.

16. The non-transitory computer-readable medium of claim 14, wherein the modified packet is customized to the customized packet type supported by the second network element based on negotiating one or more network element capabilities.

17. The non-transitory computer-readable medium of claim 16, wherein negotiating one or more network element capabilities further includes determining a type of packet the second network element can capture, determining whether the type of packet can add the tracing header, and determining a type of tracing data the second network element can produce.

18. The non-transitory computer-readable medium of claim 14, wherein the packet received is a simulated packet, and wherein the tracing is of a passive traffic flow.

19. The non-transitory computer-readable medium of claim 18, wherein the simulated packet is based on a defined set of packet input parameters.

20. The non-transitory computer-readable medium of claim 14, the one or more processors further causing the computing system to:

based on a received request from the controller, transmit to the controller the forwarding information that has been stored locally.

\* \* \* \* \*